(12) United States Patent
Waki et al.

(10) Patent No.: US 8,470,278 B2
(45) Date of Patent: Jun. 25, 2013

(54) PROCESSES FOR PRODUCTION OF PHOSPHORUS PENTAFLUORIDE AND HEXAFLUOROPHOSPHATES

(75) Inventors: Masahide Waki, Izumiotsu (JP);
Tatsuhiro Yabune, Izumiotsu (JP);
Kazuhiro Miyamoto, Izumiotsu (JP);
Kazutaka Hirano, Izumiotsu (JP)

(73) Assignee: Stella Chemifa Corporation, Osaka-shi (JP)

(*) Notice: Subject to any disclaimer, the term of this patent is extended or adjusted under 35 U.S.C. 154(b) by 226 days.

(21) Appl. No.: 12/990,914

(22) PCT Filed: Aug. 4, 2009

(86) PCT No.: PCT/JP2009/063777
§ 371 (c)(1),
(2), (4) Date: Nov. 3, 2010

(87) PCT Pub. No.: WO2010/016471
PCT Pub. Date: Feb. 11, 2010

(65) Prior Publication Data
US 2011/0189538 A1    Aug. 4, 2011

(30) Foreign Application Priority Data
Aug. 8, 2008  (JP) ................. 2008-205962

(51) Int. Cl.
*C01B 25/10*   (2006.01)
(52) U.S. Cl.
USPC .......................................... 423/301
(58) Field of Classification Search
USPC .......................................... 423/301
See application file for complete search history.

(56) References Cited

U.S. PATENT DOCUMENTS

| 2,488,298 A | 11/1949 | Lange et al. |
| 3,216,799 A | 11/1965 | Olstowki |
| 3,584,999 A | 6/1971 | Wiesboeck et al. |
| 3,594,402 A | 7/1971 | Wiesboeck |

(Continued)

FOREIGN PATENT DOCUMENTS

| DE | 290889 A5 | 10/1983 |
| DE | 10027211 | 12/2001 |

(Continued)

OTHER PUBLICATIONS

Clifford, A. et al., The hydrogem fluoride solvent system—VI, J. Inorg. Chem., 1961, pp. 147-154., vol. 20.

(Continued)

*Primary Examiner* — Wayne Langel
(74) *Attorney, Agent, or Firm* — Knobbe Martens Olson & Bear LLP (57) ABSTRACT

A method of manufacturing phosphorus pentafluoride and hexafluorophosphate can suppress the manufacturing cost and also can manufacture high-quality phosphorus pentafluoride from an inexpensive and low-quality raw material. The raw material for the method can include at least a phosphorus atom and a fluorine atom. These are brought into contact with a carrier gas, and a phosphorus pentafluoride is extracted and separated into the carrier gas. A method of manufacturing hexafluorophosphate includes reacting fluoride with the resulting phosphorus pentafluoride according to the following chemical reaction scheme: $sPF_5 + AF_s \rightarrow A(PF_6)_s$, in which s is in the range of $1 \leq s \leq 3$, and A is at least one of the following: Li, Na, K, Rb, Cs, $NH_4$, Ag, Mg, Ca, Ba, Zn, Cu, Pb, Al and Fe.

27 Claims, 3 Drawing Sheets

U.S. PATENT DOCUMENTS

| | | | |
|---|---|---|---|
| 3,607,020 A | | 9/1971 | Smith, Jr. |
| 3,634,034 A | | 1/1972 | Nickerson et al. |
| 4,416,785 A | | 11/1983 | Menke et al. |
| 5,378,445 A | * | 1/1995 | Salmon et al. ............... 423/301 |
| 5,935,541 A | | 8/1999 | Bonnet et al. |
| 6,387,340 B1 | * | 5/2002 | Na et al. ...................... 423/301 |
| 6,514,474 B1 | * | 2/2003 | Kikuyama et al. ............ 423/301 |
| 6,645,451 B1 | * | 11/2003 | Schulz et al. ................. 423/301 |
| 2001/0041158 A1 | * | 11/2001 | Smith et al. .................. 423/301 |
| 2003/0143145 A1 | | 7/2003 | Kikuyama et al. |
| 2006/0019164 A1 | | 1/2006 | Bonhomme et al. |
| 2010/0233057 A1 | * | 9/2010 | Luly et al. .................... 423/301 |
| 2010/0322838 A1 | * | 12/2010 | Waki et al. .................... 423/301 |
| 2011/0097626 A1 | * | 4/2011 | Waki et al. .................... 429/199 |
| 2011/0189538 A1 | * | 8/2011 | Waki et al. .................... 429/199 |
| 2011/0286905 A1 | * | 11/2011 | Waki et al. .................... 423/301 |

FOREIGN PATENT DOCUMENTS

| | | | |
|---|---|---|---|
| EP | 0094822 A1 | | 11/1983 |
| EP | 0 846 657 A1 | | 6/1998 |
| FR | 2.082.502 | | 11/1971 |
| GB | 1 298 159 | | 11/1972 |
| JP | 46-3210 | | 10/1971 |
| JP | 50-13760 | | 5/1975 |
| JP | 60-251109 | | 12/1985 |
| JP | 64-072901 | | 3/1989 |
| JP | 04-175216 | | 6/1992 |
| JP | 2987713 | | 6/1992 |
| JP | 4-265213 | A | 9/1992 |
| JP | 5-279021 | A | 10/1993 |
| JP | 6-56413 | A | 3/1994 |
| JP | 7-81903 | A | 3/1995 |
| JP | 9-165210 | | 6/1997 |
| JP | 10-245211 | A | 9/1998 |
| JP | 10-316409 | | 12/1998 |
| JP | 10-316410 | | 12/1998 |
| JP | 11-92135 | A | 4/1999 |
| JP | 11-171517 | * | 6/1999 |
| JP | 11-171517 | A | 6/1999 |
| JP | 11-171518 | A | 6/1999 |
| JP | 2000-154009 | A | 6/2000 |
| JP | 2001-122603 | | 5/2001 |
| JP | 2001-122604 | | 5/2001 |
| JP | 2001-122605 | A | 5/2001 |
| JP | 2002-519294 | | 7/2002 |
| JP | 2005-507849 | A | 3/2005 |
| JP | 2008-195548 | | 8/2008 |
| WO | WO 99/40027 A1 | | 8/1999 |

OTHER PUBLICATIONS

Ruff, O., Fluorination of phosphorous pentachloride (PCl5) usign arsenic trifluoride, Die Chemie des Fluors, 1920, p. 29.
Willy Lange, Fluorine Chemistry vol. 1 (1950), pp. 164-167.
A.F. Clifford, et al., The Hydrogen Fluoride Solvent System-III the Preparation of Anhydrous Silver Fluoriborate, J. Inorg, Nucl. Chem., 1957, vol. 5, pp. 76 to 78.
P. Gross, et al., Heat of Formation of Phosphorus Pentafluoride, Fulmer Research Institute, Limited, Stoke Poges, Buckinghamshire, pp. 2716 to 2718.
Abstract Document No. XP-002669525, dated Feb. 3, 2012, Previous Publication No. JP 11171518A, Applicant: Central Glass Co., Ltd., Publication Date: Jun. 29, 1999, Database WPI, Week 199936, Thomson Scientific, London, GB, AN 1999-424692.
Abstract Document No. XP-002668869, dated Feb. 3, 2012, Previous Publication No. JP 1072901A, Applicant: Central Glass Co., Ltd., Publication Date: Mar. 17, 1989, Database WPI, Week 198917, Thomson Scientific, London, GB, AN 1989-126434.
Abstract Document No. XP-002668870, dated Feb. 3, 2012, Previous Publication No. JP 4265213, Applicant: Central Glass Co., Ltd., Publication Date: Sep. 21, 1992, Database WPI, Week 199244, Thomson Scientific, London, GB, AN 1992-362491.
Supplementary European Search Report for Application No. EP 09804954 completed on Mar. 1, 2012.
Office Action dated Dec. 31, 2011 in Chinese Application No. 20880004476.5.
Smagin, A.A. et al., Application of thermogravimetric studies for optimization of lithium hexafluorophosphate production, Journal of Power Sources, Mar. 3, 1997, pp. 326-327, vol. 68.
Extended Search Report in related European Application No. 08792375.1 issued Sep. 28, 2012.
Office Action in related Japanese Application No. 2008-009484 issued Oct. 23, 2012.

* cited by examiner

Bubbling (b)

(c)

Heating (d)

Heating

PROCESSES FOR PRODUCTION OF PHOSPHORUS PENTAFLUORIDE AND HEXAFLUOROPHOSPHATES

TECHNICAL FIELD

The present invention relates to a method of manufacturing phosphorus pentafluoride and hexafluorophosphate. More particularly, the present invention relates to a method of manufacturing hexafluorophosphate that is useful as an electrolyte for an electricity storage device, a catalyst for an organic synthesis reaction, and the like, and a method of manufacturing phosphorous pentafluoride that is used as a starting raw material in the manufacture of hexafluorophosphate.

BACKGROUND ART

In a hybrid car and an electric car that are expected as a last resort for reducing $CO_2$ emission, a lithium ion secondary battery is regarded as a key device. As an electrolyte of the lithium ion secondary battery, lithium hexafluorophosphate having high safety and excellent electrical characteristics is exemplified. A hexafluorophosphate including lithium hexafluorophosphate is manufactured by using phosphorus pentafluoride "$PF_5$" as a starting raw material. Phosphorus pentafluoride is a substance that is used as a fluorinating agent of various chemical reactions in the chemical industry and is gaseous at room temperature.

On the other hand, silver hexafluorophosphate "$AgPF_6$" or potassium hexafluorophosphate "$KPF_6$" as a kind of hexafluorophosphates has been attracting special interest as a counter ion that generates an acid necessary for an initiation and growth reaction in photopolymerization. Also, ammonium hexafluorophosphate "$NH_4 PF_6$" is useful as a raw material that is used in the manufacture of a pharmaceutical intermediate. Furthermore, quaternary ammonium salts such as triethylmethylammonium hexafluorophosphate and tetraethylammonium hexafluorophosphate are useful as electrolytes for an electric double layer capacitor that is expected as a high power electricity storage device.

As described above, the hexafluorophosphate is used as an indispensable substance depending on functions required in various fields, and $PF_5$ is a very important substance as a raw material in the manufacture of the hexafluorophosphate. However, when the hexafluorophosphate is manufactured by using $PF_5$, there is a common problem about the manufacturing cost of $PF_5$. Particularly, high purity $PF_5$ used in the manufacture of a high quality hexafluorophosphate that can be used as an electrolyte of a lithium ion secondary battery or the like is remarkably expensive.

The methods of manufacturing $PF_5$ and hexafluorophosphate are described in various documents as exemplified below.

Patent Document 1 discloses a method of manufacturing $PF_5$ by thermally decomposing a raw material. For example, in the case of thermal decomposition of $LiPF_6$ (Scheme 1 shown below), the decomposition slightly occurs around 120° C. and $LiPF_6$ decomposes completely around 200° C. to 250° C. Thereafter, a powder of LiF remains. Furthermore, in other cases, it is difficult to decompose $PF_5$ if the decomposition is not performed at a very high temperature such as about 250° C. in the case of $NH_4PF_6$, about 400° C. in the case of $NaPF_6$, and 600° C. to 700° C. in the case of $KPF_6$ and $CsPF_6$. Therefore, expensive heat-resistant manufacturing facilities are required, resulting in increased manufacturing cost. Thus, it is hard to say that the manufacturing method disclosed in Patent Document 1 is industrially reasonable.

$$LiPF_6(s) \rightarrow LiF(s) + PF_5(g) \quad \text{[Chemical Formula 1]}$$

In the reactions of fluorination of phosphorous using $ClF_3$ in a liquid hydrogen fluoride medium (refer to Non-Patent Document 1) and fluorination of phosphorous using a fluorine gas (refer to Patent Document 2 and Non-Patent Document 2), there is a problem that it is very difficult to control the reactions because the reactions proceed explosively. Furthermore, since an expensive fluorine gas is used, as a matter of course, the resultant $PF_5$ is also expensive.

Patent Document 3 describes the reaction of fluorination of phosphoryl trifluoride "$POF_3$" using HF in the presence of sulfur trioxide. However, there is a problem that the reaction is inferior in yield and sulfuric acid is produced, resulting in very severe corrosion in the presence of HF.

Patent Document 4 discloses a method of reacting hexafluorophosphoric acid ($HPF_6$) with a sulfur-based acid under a high pressure. However, similarly to Patent Document 3, there is a problem that sulfuric acid is produced, resulting in very severe corrosion in the presence of HF and, even when fuming sulfuric acid is used, water or fluorosulfuric acid ($HSO_3F$) in the system reacts with $PF_5$ and the resultant $PF_5$ is decomposed into $POF_3$.

Non-Patent Document 3 describes that $LiPF_6$ is manufactured by dissolving lithium chloride in HF and adding phosphorus pentachloride thereto. Also, Patent Document 5 describes that hexafluorophosphate is manufactured by reacting phosphorus pentachloride with a HF gas at a temperature within a range from 60 to 165° C. and adding the resultant $PF_5$ to an anhydrous HF solution of an alkali metal fluoride.

However, in the manufacturing methods disclosed in Non-Patent Document 3 and Patent Document 5, since phosphorus pentachloride is a solid having high hygroscopicity and is inferior in workability, there are problems that handling properties are poor when raw materials are charged in the manufacturing facilities, and that it is difficult to attempt mechanization. Also, when phosphorus halides typified by phosphorus pentachloride are used as raw materials, a large amount of hydrogen halide is produced as by-products, thus requiring long and large-size facilities for treatment of an exhaust gas. Furthermore, moisture contained in phosphorus pentachloride is mixed into the reaction system and a portion of the resultant $PF_5$ reacts with the moisture to form phosphorus oxyfluoride such as $POF_3$ or $PO_2F$ as a by-product. As a result, when the hexafluorophosphate is $LiPF_6$, oxyfluorophosphoric acid compounds such as $LiPOF_4$ and $LiPO_2F_2$ are produced and contaminate products, resulting in deterioration of productivity of $LiPF_6$. Also, when $LiPF_6$ manufactured by the method is used as an electrolyte of a lithium battery, there arises a problem that the oxyfluorophosphoric acid compounds cause deterioration of characteristics of the battery.

In order to alleviate the problems described above, for example, Patent Document 6 discloses the following manufacturing method. First, $PF_5$ is produced by reacting phosphorus pentachloride with anhydrous HF. Next, phosphorus oxyfluoride is separated by cooling a mixed gas of $PF_5$ and hydrogen chloride to the temperature that is the boiling point of phosphorus oxyfluoride or lower and the boiling point of $PF_5$ or higher, for example, −40° C. to −84° C., followed by the reaction with lithium fluoride dissolved in anhydrous HF. According to this method, a small amount of phosphorus oxyfluoride is separated from the mixed gas of large excess hydrogen chloride and $PF_5$. However, phosphorus oxyfluoride cannot be completely separated and it is very hard to perform the separation operation. Since the boiling point and the solidifying point of $POF_3$ as phosphorus oxyfluoride are close to each other, there are problems such as the possibility of occlusion of the collector. Therefore, this manufacturing method is not suited for industrial applications.

Also, Patent Document 7 discloses a method of manufacturing $PF_5$ using, as a phosphorus raw material, a chloride (phosphorus trichloride or phosphorus pentachloride). However, according to this manufacturing method, the resultant $PF_5$ contains hydrogen chloride mixed therein. Since the boiling point of $PF_5$ is −84.8° C., whereas the boiling point of hydrogen chloride is −84.9° C., it is impossible to separate hydrogen chloride from $PF_5$ by a simple method.

The above-described methods of manufacturing $PF_5$ and hexafluorophosphate have various problems such as poor workability, reactions under severe conditions, use of expensive raw materials, and disposal of by-products. Therefore, the manufacturing cost increases. Particularly, high-quality $PF_5$ is expensive since it is difficult to manufacture. As a result, the hexafluorophosphate manufactured using $PF_5$ as the raw material is also expensive. Therefore, in order to manufacture inexpensive and high-quality hexafluorophosphate, it is important to manufacture inexpensive and high-quality $PF_5$. In other words, it is necessary to suppress an adverse influence exerted by mixing-in of impurities, particularly moisture and to adopt a method capable of utilizing, as a starting raw material, a raw material taking working environment into consideration.

PRIOR ART DOCUMENTS

Patent Documents
Patent Document 1: Japanese Unexamined Patent Publication No. 2000-154009
Patent Document 2: Japanese Unexamined Patent Publication No. 2001-122605
Patent Document 3: French Patent No. 2,082,502
Patent Document 4: Japanese Published Patent Publication No. 2005-507849
Patent Document 5: Japanese Unexamined Patent Publication No. 06-056413
Patent Document 6: Japanese Unexamined Patent Publication No. 5-279003
Patent Document 7: Japanese Unexamined Patent Publication No. 11-92135
Non-Patent Documents
Non-Patent Document 1: Clifford, Beachell, Jack, Inorg. Nucl. Chem. (1957), 5, 57-70
Non-Patent Document 2: Gros, Hayman, Stuart, Trans. Faraday Soc. (1996), 62(10), 2716-18
Non-Patent Document 3: Fluorine Chemistry, Vol. 1 (1950)

DISCLOSURE OF THE INVENTION

Problems to be Solved by the Invention

An object of the present invention is to provide a method of manufacturing phosphorus pentafluoride, that can suppress the manufacturing cost and also can manufacture high-quality phosphorus pentafluoride from an inexpensive and low-quality raw material. Another object thereof is to provide a method of manufacturing hexafluorophosphate, that can manufacture a high-quality hexafluorophosphate while suppressing the manufacturing cost, using phosphorus pentafluoride obtained by the manufacturing method of phosphorus pentafluoride as a raw material. Still another object thereof is to provide an electrolytic solution in which a high-quality hexafluorophosphate obtained by the manufacturing method of hexafluorophosphate, and an electricity storage device including the electrolytic solution.

Means for Solving the Problems

The present inventors have intensively studied about a method of manufacturing phosphorus pentafluoride and hexafluorophosphate so as to solve the problems of the prior art. As a result, they have found that the above-described objects of the present invention can be achieved by adopting the constitutions described hereinafter, and thus the present invention has been completed.

That is, in order to achieve the above described object, the present invention relates to a method of manufacturing phosphorus pentafluoride, wherein a raw material which comprises at least a phosphorus atom and a fluorine atom is brought into contact with a carrier gas, thereby a phosphorus pentafluoride is extracted and separated into the career gas.

In the above-described method, a carrier gas is brought into contact with a raw material made up of at least a phosphorus atom and a fluorine atom contained therein, thus making it possible to separate and extract phosphorus pentafluoride from the raw material while being accompanied by a carrier gas. The thus extracted phosphorus pentafluoride does not contain impurities such as oxyfluorophosphoric acid compounds, metals and moisture, and therefore has high purity. As a result, it is possible to simply and easily obtain extremely high-quality phosphorus pentafluoride as a raw material of hexafluorophosphate while suppressing the manufacturing cost.

It is preferable that the fluorine atom in the raw material is contained in the form of hydrogen fluoride.

It is preferable that a hydrogen fluoride gas is used as the carrier gas. Therefore, the raw material made up of at least a phosphorus atom and a fluorine atom contained therein reacts with a portion of a hydrogen fluoride gas to produce phosphorus pentafluoride.

It is preferable that the phosphorus pentafluoride is generated by evaporating the phosphorus pentafluoride together with a hydrogen fluoride gas by heating or decompressing of the raw material.

And in order to achieve the above described object, the present invention relates to a method of manufacturing phosphorus pentafluoride, comprising the step of: contacting a raw material that contains at least a phosphorus atom with a hydrogen fluoride gas, which functions as a carrier gas, to extract and separate the phosphorus pentafluoride into the hydrogen fluoride gas.

In the above-described method, a raw material made up of at least a phosphorus atom contained therein is brought into contact with hydrogen fluoride as a carrier gas. Thus, a raw material containing a phosphorus atom reacts with a portion of a hydrogen fluoride gas to produce phosphorus pentafluoride. This phosphorus pentafluoride is generated while being accompanied by the hydrogen fluoride gas. The thus extracted phosphorus pentafluoride does not contain impurities such as oxyfluorophosphoric acid compounds, metals and moisture, and therefore has high purity. As a result, it is possible to simply and easily obtain extremely high-quality phosphorus pentafluoride as a raw material of hexafluorophosphate while suppressing the manufacturing cost.

It is preferable that at least a polyatomic ion containing a phosphorus atom and a fluorine atom exists in the raw material after being contacted with the carrier gas.

It is preferable that the polyatomic ion contains at least a $PF_6^-$ ion.

It is preferable that the raw material is reused after generating the phosphorus pentafluoride.

In order to achieve the above described object, the present invention relates to a method of manufacturing hexafluorophosphate, comprising the step of: reacting fluoride with phosphorus pentafluoride obtained by the method of manufacturing phosphorus pentafluoride of Claim 1 according to the following chemical reaction scheme, $$sPF_5 + AF_s \rightarrow A(PF_6)_s \qquad \text{[Chemical Formula 2]}$$

wherein s is in the range of $1 \leq s \leq 3$, and A is at least one member selected from the group consisting of Li, Na, K, Rb, Cs, $NH_4$, Ag, Mg, Ca, Ba, Zn, Cu, Pb, Al and Fe.

Since phosphorus pentafluoride obtained by the above-described manufacturing method does not contain impurities such as moisture and has high purity as compared with that obtained by a conventional manufacturing method, it is possible to suppress production of a hydrolyzate of hexafluorophosphate. In other words, the above-described method enables manufacture of a high purity hexafluorophosphate free from a hydrolyzate.

It is preferable that the reaction of phosphorus pentafluoride with the fluoride comprises: a first step of dissolving a phosphorus pentafluoride gas in a solvent; a second step of adding a fluoride to the solvent in the amount, that is stoichiometrically equivalent or less than that of phosphorus pentafluoride, to produce a solution of hexafluorophosphate; and a third step of circulating the solution of the hexafluorophosphate to the first step, thereby dissolving a phosphorus pentafluoride gas in the solution of the hexafluorophosphate in place of the solvent.

In general, the fluoride is hardly soluble in an anhydrous HF solvent or organic solvent having a low dielectric constant. Therefore, when a fluoride is added to these solvents before absorption of a phosphorus pentafluoride gas, a suspended (slurry) state is formed. Therefore, during absorption of phosphorus pentafluoride, occlusion due to a solid fluoride occurs inside an apparatus, resulting in that the operation is impeded. However, according to the above-described method, after a phosphorus pentafluoride gas is absorbed to the solvent in the first step, the fluoride is added to the solvent in the second step. Thus, as shown in the above-described Scheme 1, hexafluorophosphate is synthesized in the solvent. Furthermore, since the amount of the fluoride to be added is stoichiometrically equivalent or less than that of phosphorus pentafluoride, the entire fluoride reacts with phosphorus pentafluoride, thus obtaining hexafluorophosphate solution in a non-slurry state in which the unreacted fluoride does not remain. Therefore, the hexafluorophosphate solution can be circulated to the first step and a phosphorus pentafluoride gas can be dissolved in the hexafluorophosphate solution in place of the solvent (third step). In other words, the above-described method enables use of various apparatuses including an absorption tower and enables continuous operation, and also enables an improvement in productivity of the hexafluorophosphate.

It is preferable that a hydrogen fluoride solution is used as the solvent.

It is preferable that an organic solvent is used as the solvent.

It is preferable that the organic solvent is at least one member selected from the group consisting of nonaqueous organic solvents and nonaqueous ionic liquids. Therefore, similarly to the anhydrous HF solvent, phosphorus pentafluoride can be absorbed without inducing hydrolysis. When phosphorus pentafluoride or the hexafluorophosphate undergoes hydrolysis, oxyfluorophosphoric acid and acidic substances such as HF and phosphoric acid, or components insoluble in the above-described solvents, for example, oxyfluorophosphates and phosphates are produced. When an electrolytic solution containing these acidic substances and insoluble components is used in the electricity storage device, the solution exerts adverse influences such as corrosion of the electricity storage device and deterioration of electrical characteristics. Therefore, a solvent having low moisture concentration is preferably used as the solvent. From such a point of view, the moisture concentration of the organic solvent is preferably 100 ppm by weight or less, more preferably 10 ppm by weight or less, and particularly preferably 1 ppm by weight or less.

It is preferable that the first step and the third step are conducted using an absorption tower. According to the manufacturing method of the present invention, the fluoride is added after dissolving the phosphorus pentafluoride gas in the solvent and the hexafluorophosphate solution, a suspended (slurry) state is not formed. Therefore, even when an absorption tower is used in the first step and the third step, the manufacturing method of the present invention enables prevention of occlusion inside the absorption tower and enables continuous operation. As a result, productivity of the hexafluorophosphate can be improved.

It is preferable that the unreacted phosphorus pentafluoride gas among the phosphorus pentafluoride gas is collected by being absorbed into an absorption solution and then be reused. Thus, loss of the phosphorus pentafluoride gas as the raw material can be prevented and manufacturing efficiency can be improved.

In order to achieve the above described object, the present invention relates to an electrolytic solution comprising the hexafluorophosphate obtained by the method of manufacturing hexafluorophosphate.

In order to achieve the above described object, the present invention relates to an electricity storage device comprising the electrolytic solution. Examples of the electricity storage device of the present invention include a lithium ion secondary battery.

Effects of the Invention

The present invention exerts the following effects by means described above.

According to the present invention, it is possible to manufacture inexpensive and high-quality phosphorus pentafluoride with low moisture concentration and high purity without requiring a complicated treatment operation and a special device, using a low-quality raw material. It is also possible to easily manufacture an inexpensive and high-quality hexafluorophosphate without using a complicated device, using high-quality phosphorus pentafluoride obtained by the present invention. It is also possible to obtain an electricity storage device, that has high safety and is also excellent in electrical characteristics, by applying a high-quality hexafluorophosphate obtained by the present invention to an electrolytic solution.

MODES FOR CARRYING OUT THE INVENTION

Method of Manufacturing Phosphorus Pentafluoride

One embodiment of the present invention will be described in the following.

The method of manufacturing phosphorus pentafluoride according to the present embodiment is performed by bringing a raw material made up of at least a phosphorus atom and a fluorine atom contained therein into contact with a carrier gas.

The raw material made up of at least a phosphorus atom and a fluorine atom contained therein may be in any state of liquid, gas and solid. The raw material may also be formed into a solution by dissolving it in water, an anhydrous hydrogen fluoride solvent or an organic solvent.

In the raw material, the substance having a phosphorus atom is not particularly limited and examples thereof include white phosphorus, red phosphorus, black phosphorus, phosphorus trichloride ($PCl_3$), phosphorus tribromide ($PBr_3$), phosphine ($PH_3$), phosphorous acid, phosphorus pentaoxide ($P_2O_5$), orthophosphoric acid ($H_3PO_4$), polyphosphoric acid, metaphosphoric acid, pyrophosphoric acid, triphosphoric acid, isohypophosphoric acid, phosphonic acid, phosphinic acid, phosphenic acid, diphosphonic acid, cyanophosphoric acid, cyanophosphonic acid, diethyldithiophosphinic acid, chlorophenylphosphonic acid, trimethyl phosphate, o-methyl phenylselenophosphinate, pyrophosphonic acid, oxyphosphorus halides such as phosphorus oxychloride ($POCl_3$), phosphorus oxybromide ($POBr_3$), phosphorus oxyiodide ($POI_3$) and phosphorus oxyfluoride ($POF_3$), phosphorus pentasulfide ($P_2S_5$), phosphorus thiofluoride ($PSF_3$), trichlorophosphine sulfide ($PSCl_3$), phosphonitrile fluoride ($PNF_2$), phosphonitrile chloride ($PNCl_2$), phosphorus pentachloride, phosphorus pentabromide, phosphorus pentaiodide, $HPF_6$, $LiPF_6$, $NaPF_6$, $KPF_6$, $RbPF_6$, $CsPF_6$, $NH_4PF_6$, $AgPF_6$, $Mg(PF_6)_2$, $Ca(PF_6)_2$, $Ba(PF_6)_2$, $Zn(PF_6)_2$, $Cu(PF_6)_2$, $Pb(PF_6)_2$, $Al(PF_6)_3$ and $Fe(PF_6)_3$. These phosphorus compounds can be used alone, or two or more kinds thereof can be used in combination.

In the raw material, examples of the substance having a fluorine atom include HF. In this case, HF may be used in the form of anhydrous hydrogen fluoride, or may also be used after dissolving it in water, an organic solvent, or a mixed solvent of water and an organic solvent. HF is not particularly limited and, for example, commercially available hydrofluoric acid of an industrial grade, a general grade, a semiconductor grade or the like can be used as it is, or used after appropriately adjusting the concentration. In view of a small amount of impurities, hydrofluoric acid of a semiconductor grade is preferably used. In view of the cost, anhydrous hydrogen fluoride, industrial grade or general grade is preferably used. As the concentration of impurities, the concentration of each metal impurity is preferably 1,000 ppm by weight or less.

The content of the phosphorus atom in the raw material is not particularly limited and is preferably 0.01% by weight or more and 25% by weight or less, more preferably 0.01% by weight or more and 15% by weight or less, and particularly preferably 0.1% by weight or more and 10% by weight or less. When the content of the phosphorus atom is less than 0.01% by weight, the yield of phosphorus pentafluoride may decrease. In contrast, when the content of the phosphorus atom is more than 25% by weight, if the raw material is in the form of a solution, the viscosity of the solution increases. As a result, a problem may arise when liquid transfer is performed. Also, a problem of generation of a gas may arise.

The content of the fluorine atom in the raw material is not particularly limited, and is preferably 0.03% by weight or more, and more preferably 0.3% by weight or more.

The fluorine atoms in the raw material preferably exist in the ratio that is chemically equivalent or more than that of the ratio of the phosphorus atoms within a numerical range of the content of the fluorine atoms. When the ratio of the fluorine atoms in the raw material is less than the chemically equivalent ratio, the concentration of $PF_5$ that can be produced in the raw material can be 0.05% by weight or less. Thus, the vapor pressure of $PF_5$ excessively decreases and the amount of the carrier gas required for obtaining a desired amount of $PF_5$ increases. As a result, there is a problem that a large-size extractor is required, resulting in poor economy.

When a polyatomic ion containing a phosphorus atom and a fluorine atom exists in the raw material after contact with a carrier gas described hereinafter, it is preferred to use the raw material in a liquid state at the concentration within a range from 0.03% by weight to 50% by weight, and preferably from 0.5% by weight to 20% by weight. It is not necessary that the substance having a phosphorus atom is completely dissolved in the solution and may be in a suspended state. Examples of the polyatomic ion include a $PF_6^-$ ion, a $POF_4^-$ ion and a $PO_2F_2^-$ ion. It is preferred that at least a $PF_6^-$ ion is contained as a polyatomic ion in view of retention of purity of a $PF_5$ gas to be extracted by a carrier gas.

There is no particular limitation on the method of manufacturing the raw material by mixing the substance having a phosphorus atom with the substance having a fluorine atom. For example, the method may be a continuous method or a batch method. The raw material may also be manufactured by placing the substance having a fluorine atom such as HF after placing the substance having a phosphorus atom in a mixing vessel. The order of placing may be reversed.

The temperature at which the substance having a phosphorus atom is mixed with the substance having a fluorine atom is not particularly limited, and is preferably within a range from −50 to 200° C. When the temperature is lower than −50° C., a composition containing the substance having a phosphorus atom and the substance having a fluorine atom is sometimes solidified. In contrast, it is sometimes not preferred that the temperature is higher than 200° C. since a special device is required in view of heat resistance or the like.

Regarding the moisture in the raw material, the lower the vapor pressure of moisture, the better. The reason is that when moisture is extracted in a carrier gas, hydrolysis of $PF_5$ extracted simultaneously is induced. From such a point of view, the moisture concentration in the raw material is preferably 5% by weight or less, more preferably 0.5% by weight or less, and particularly preferably 0.05% by weight or less.

It is not necessary that the raw material has high purity and the raw material may contain metal impurities. The raw material may contain a sulfate radical, moisture, or impurities containing oxygen, such as an oxyfluorophosphoric acid compound for the following reason. According to the manufacturing method of the present invention, these impurities are not extracted in a carrier gas even when contacted with the carrier gas, and thus $PF_5$ to be manufactured is not contaminated. In other words, according to the method of manufacturing phosphorus pentafluoride of the present invention, it is not necessary to employ a complicated and advanced purifying method even when an easily available low-quality raw material is used, and thus high-quality $PF_5$ is obtained. The high-quality $PF_5$ is assumed to mean that the moisture concentration in $PF_5$ is 50 ppm by weight or less and the concentration of various metal impurities is 1 ppm by weight or less when it is used as the raw material of high-quality $LiPF_6$. When the hexafluorophosphate is, for example, $LiPF_6$, in uses as an electrolyte for a lithium ion secondary battery, standards of purity, moisture, metal impurities, free hydrofluoric acid, insoluble residues and the like, that exert an adverse influence on safety of the battery, are severely regulated and also an extremely high quality such as high purity is required. Specifically, in the case of $LiPF_6$, those having the purity of 99.9% or more, the moisture concentration of 50 ppm by weight or less, the concentration of various metal impurities of 1.0 ppm by weight or less and the concentration of free hydrofluoric acid of 50 ppm by weight or less are defined as high-quality $LiPF_6$.

The carrier gas to be brought into contact with the raw material is preferably inert to the raw material. Specific examples thereof include a HF gas, a $N_2$ gas, a He gas, an Ar gas, dry air and carbon dioxide. Of these gases, a HF gas is preferable in present invention. The HF gas can be easily liquefied by cooling or pressurizing. Therefore, there is an advantage that separation with a $PF_5$ gas can be easily performed when the HF gas is used as the carrier gas. Furthermore, when the HF gas is gasified by means such as heating after liquefying and recovering, it is possible to recycle the HF gas as the carrier gas. The HF gas may also be mixed with other gases listed above.

The moisture content of the carrier gas is preferably 1% by weight or less, more preferably 100 ppm by weight or less, and particularly preferably 10 ppm by weight or less. When the moisture content is more than 1% by weight, the moisture content in phosphorus pentafluoride to be extracted also increases. It is not preferred to use this phosphorus pentafluoride as the raw material of the hexafluorophosphate since a hydrolyzate of the hexafluorophosphate is produced by the moisture contained.

Figure 1:
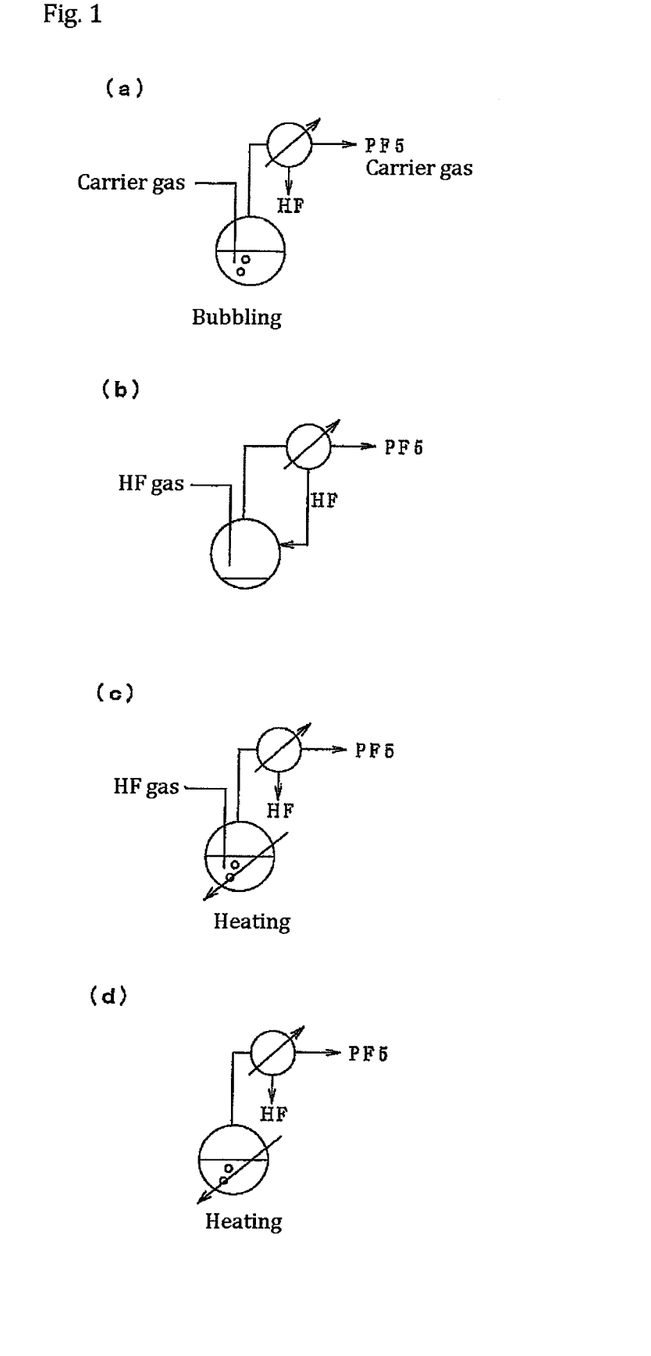
FIG. 1 is an illustrative drawing schematically showing a manufacturing apparatus of phosphorus pentafluoride according to one embodiment of the present invention.

There is no particular limitation on the method of bringing the raw material into contact with the carrier gas, and a conventionally used vessel or tower type gas-liquid contactor is preferably used. For example, as shown in FIG. 1(a), a contacting operation is performed by bubbling the carrier gas into the raw material or the solution thereof. Water is scarcely contained in phosphorus pentafluoride extracted together with the carrier gas, and thus high-quality phosphorus pentafluoride is obtained, which is suited for use as the raw material of the hexafluorophosphate.

When a HF gas is used as the carrier gas, as shown in FIG. 1(b), upon placing a HF gas as the carrier gas in a vessel filled with a raw material, a portion of the HF gas reacts with the raw material to produce a phosphorus pentafluoride gas. This phosphorus pentafluoride gas can be extracted in the HF gas. It is effective to condense and separate the HF gas from the discharged gas by a heat exchanger or the like, and to reflux the HF gas to the vessel in which the raw material is contacted with the carrier gas. Thus, the raw material can be further reacted with the HF gas and the amount of phosphorus pentafluoride extracted can be further increased.

When the HF gas is used as the carrier gas, as shown in FIG. 1(c), the HF gas is dissolved in the raw material in advance and this mixed solution may be distilled by heating. Therefore, it is possible to valorize the HF gas, and to extract and separate phosphorus pentafluoride. In this case, in the mixed solution after further dissolving the HF gas, the concentration of HF based on the total weight of HF and moisture is preferably 90% by weight or more, more preferably 95% by weight or more, and particularly preferably 98% by weight or more.

In the mixed solution after further dissolving the HF gas, the concentration of a polyatomic ion containing a phosphorus atom and a fluorine atom is preferably from 0.03% by weight to 50% by weight, and more preferably from 0.5% by weight to 20% by weight. It is not necessary that the substance having a phosphorus atom is completely dissolved in the mixed solution and may also be in a suspended state.

Furthermore, when a large amount of HF as the substance having a fluorine atom is contained in the raw material, as shown in FIG. 1(d), phosphorus pentafluoride can be extracted and separated in the HF gas generated by heating the raw material. In this method, the HF gas generated acts as a carrier gas. In this method, another carrier gas prepared separately may be simultaneously brought into contact with the raw material, thereby extracting and separating the HF gas and $PF_5$ in the separately prepared carrier gas. The case where a large amount of HF is contained in the raw material means the case where the amount of HF is 10 times or more and 5,000 times or less, and preferably 50 times or more and 500 times or less, in terms of a molar ratio, as that of the phosphorus atom in the raw material.

There is no particular limitation on the method of heating the raw material having a phosphorus atom and a fluorine atom, and a vessel type heater equipped with a heat exchanger, or a heater of a distillation tower type is preferably used regardless of a batch type or a continuous type.

The amount of the carrier gas used is preferably 10 times or more and 5,000 times or less, and more preferably 50 times or more and 500 times or less, in terms of a molar ratio, as that of the phosphorus atom in the raw material. It is not preferred that the amount is more than the upper limit since the energy cost increases although extraction efficiency of phosphorus pentafluoride improves. In contrast, it is not preferred when the amount is less than the lower limit since the amount of phosphorus pentafluoride extracted decreases and phosphorus is discharged out of the reaction system.

The temperature at which the carrier gas is brought into contact with the raw material is preferably from −50° C. to 100° C., more preferably from −10 to 50° C., and particularly preferably from 0° C. to 30° C. When the temperature is lower than −50° C., there is a problem that the vapor pressure of phosphorus pentafluoride decreases and thus extraction efficiency deteriorates. In contrast, when the temperature is higher than 100° C., there is a problem that water penetrates into the system and hydrolysis of phosphorus pentafluoride occurs. In the case of the method by distillation shown in FIGS. 1(c) and 1(d), it is necessary that the heating temperature is the boiling point of a hydrogen fluoride solution or higher. More specifically, when the contacting operation is performed under 1 atm, the temperature is preferably within a range from 19.5 to 50° C., and more preferably from 20 to 30° C.

The pressure under which the carrier gas is brought into contact with the raw material is preferably from 1 KPa to 5 MPa, more preferably from 10 KPa to 1 MPa, and particularly preferably from 0.05 MPa to 0.5 MPa. When the pressure is lower than 1 KPa, there is a problem that long and large-size vacuum facilities are required, resulting in excess cost. In contrast, when the pressure is higher than 5 MPa, there is a problem that a high pressure apparatus becomes too large.

In the method of manufacturing phosphorus pentafluoride according to the present invention, phosphorus pentafluoride may also be manufactured by bringing a carrier gas into contact with a raw material having a phosphorus atom. In this case, a HF gas is used as the carrier gas. When the HF gas is contacted with the raw material having a phosphorus atom, a reaction occurs between them and phosphorus pentafluoride is extracted in the carrier gas. Furthermore, the HF gas enables separation and extraction of phosphorus pentafluoride free from moisture.

When phosphorus oxyfluoride such as $POF_3$ is extracted in the carrier gas, in addition to phosphorus pentafluoride, it is preferred to bring the carrier gas into contact with anhydrous hydrogen fluoride. In this case, it is more preferred to bring the carrier gas into contact with liquid anhydrous hydrogen fluoride. Thus, as shown in the following chemical reaction scheme, $PF_5$ can be newly produced by reacting phosphorus oxyfluoride such as $POF_3$ with anhydrous hydrogen fluoride.

$$POF_3 + 2HF \rightarrow PF_5 + H_2O \qquad \text{[Chemical Formula 3]}$$

It is preferred that the carrier gas used in the manufacture of phosphorus pentafluoride is recycled. For example, when a HF gas is used as the carrier gas, phosphorus pentafluoride and HF are separated by condensing a HF gas containing phosphorus pentafluoride. HF thus condensed and recovered may be recycled as the carrier gas or used as the raw material of a fluorine atom after vaporized by heating. The temperature at which the HF gas is condensed is preferably from $-80°$ C. to $100°$ C., more preferably from $-50°$ C. to $50°$ C., and particularly preferably from $-10$ to $20°$ C.

It is preferred that a phosphorus component and a fluorine component are separated and recovered from the raw material from which the phosphorus pentafluoride has been separated. The recovered phosphorus component can be recycled as the raw material of a phosphorus atom after concentration. In the separation operation, for example, a conventionally known method such as distillation can be employed. The fluorine component may be recovered and recycled as the raw material of a fluorine atom, or may be recovered as HF and used as it is as industrial hydrofluoric acid, or may be used after appropriately adjusting the concentration. When the amount of the fluorine component is very small, the fluorine component may be discharged after directly subjected to a waste water treatment.

When extraction of $PF_5$ in the carrier gas from the raw material having a phosphorus atom and a fluorine atom proceeds, $PF_5$ may sometimes be redissolved in the raw material. Therefore, with the progress of extraction of $PF_5$, the amount of $PF_5$ extracted decreases. It is effective to perform a continuous operation so as to suppress such a phenomenon.

The continuous operation can be realized by continuously feeding the raw material to a contactor for contacting the raw material with the carrier gas, while continuously removing the extracted raw material from the contactor. It is possible to quantitatively manufacture $PF_5$ by performing this continuous operation.

When HF is accompanied in the carrier gas together with $PF_5$, it is effective to condense and separate HF by a heat exchanger and then reflux HF to a contactor for contacting the raw material with the carrier gas. Sometimes, a small amount of $PF_5$ is contained in the refluxed HF. In this case, HF containing a small amount of $PF_5$ may be refluxed as it is, or may be refluxed after fed to a separator prepared separately to separate $PF_5$.

In the above-described case, it is not always necessary to isolate $PF_5$, and $PF_5$ may be used as it is in the subsequent step according to the purpose.

When a carrier gas other than the HF gas is used, the amount of the fluorine atom in the raw material decreases by extraction of $PF_5$ from the raw material, while the vapor pressure of moisture in the raw material increases and thus the extracted $PF_5$ may be contaminated or hydrolysis may be induced. In such a case, it is preferred that HF is timely supplied to a conductor for contacting the carrier gas with the raw material.

The material of the apparatus used in the method of manufacturing $PF_5$ according to the present invention is not particularly limited, and general-purpose materials such as carbon steel and stainless steel can be suitably used. If necessary, high-grade materials such as high alloy steel may be used, and resin materials such as a fluororesin or a vinyl chloride resin, or a resin lining material coated with the resin material may also be used. Furthermore, these materials may be appropriately used in combination.

Method of Manufacturing Hexafluorophosphate

By bringing a high-quality $PF_5$ gas obtained by the above-described method into contact with a fluoride (AFs), hexafluorophosphate is manufactured as shown in the following chemical reaction scheme. Also, a high purity $PF_5$ complex can be obtained by making an organic solvent to absorb the high-quality $PF_5$ obtained by this method. Examples of the organic solvent include, but are not limited to, methanol, tetrahydrofuran, diethylether, tetrahydrothiophene, triethylamine, propylene carbonate, dimethyl carbonate and diethyl carbonate. Furthermore, a hexafluorophosphoric acid solution free from water can be obtained by adding a chemical equivalent of HF to a $PF_5$ complex.

$$sPF_5 + AF_s \rightarrow A(PF_6)_s \qquad \text{[Chemical Formula 4]}$$

wherein s satisfies the relationship: $1 \leq s \leq 3$, and A is at least one kind selected from the group consisting of Li, Na, K, Rb, Cs, $NH_4$, Ag, Mg, Ca, Ba, Zn, Cu, Pb, Al and Fe.

As a specific method of manufacturing the hexafluorophosphate, (1) a method of reacting a solid fluoride with a $PF_5$ gas, (2) a method of reacting a fluoride dissolved or suspended in anhydrous HF as a solvent with a $PF_5$ gas or (3) a method of reacting a fluoride with a $PF_5$ gas in an organic solvent can be exemplified.

The reaction temperature of the fluoride with the $PF_5$ gas is preferably from $-50°$ C. to $200°$ C., more preferably from $-10$ to $100°$ C., and particularly preferably from $0°$ C. to $50°$ C. When the reaction temperature is lower than $-50°$ C., the reaction sometimes does not proceed easily. In contrast, when the reaction temperature is higher than $200°$ C., the produced hexafluorophosphate is sometimes decomposed. In the case of the method (2) of reacting anhydrous HF containing a fluoride (including an acidic fluoride) with the $PF_5$ gas obtained by the present invention, it is preferred to react them at the boiling point or lower (for example, under 1 atm, $19.5°$ C. or lower, preferably $0$ to $10°$ C.) by subjecting them to a treatment such as cooling so as to suppress the decomposition reaction of the hexafluorophosphate to be produced.

In view of an improvement in purity and yield of the hexafluorophosphate, it is preferred that an excess amount of the $PF_5$ gas is reacted with the fluoride "AFs". Specifically, the weight ratio of the $PF_5$ gas to AFs is preferably from 1 to 10 times, more preferably from 1.01 to 5 times, and particularly preferably from 1.05 to 2 times. Specifically, when the weight ratio of the $PF_5$ gas to AFs is more than 10 times, although the yield of the hexafluorophosphate increases, the excess $PF_5$ gas may flow out of the reaction system, resulting in a decrease of the yield of phosphorus. In contrast, it is not preferred when the weight ratio is less than 1 time since the yield of the hexafluorophosphate decreases.

In order to reduce a loss of $PF_5$, a gas containing excess $PF_5$ flowing out of the reaction system is absorbed in water or 0 to 80% by weight of an aqueous HF solution, or water or 0 to 80% by weight of an aqueous HF solution, that contains an M salt (M salt is at least one of a carbonate, a hydroxide and a halide of at least one selected from the group consisting of Li, Na, K, Rb, Cs, $NH_4$, Ag, Mg, Ca, Ba, Zn, Cu, Pb, Fe and Al) dissolved therein, as an absorption solution, and is recovered as $M(PF_6)_s$ ($1 \leq s \leq 3$) or $H_xPO_yF_z$ ($0 \leq s \leq 3$, $1 \leq y \leq 4$, $0 \leq z \leq 6$). Particularly preferably, a gas containing excess $PF_5$ flowing out of the reaction system is absorbed in water or 0 to 80% by weight of an aqueous HF solution, that contains a fluoride of $MF_s \cdot r$ (HF) ($1 \leq s \leq 3$, $0 \leq r \leq 6$), thus making it possible to recover the gas as $M(PF_6)_s \cdot r$ (HF) ($1 \leq s \leq 3$, $0 \leq r \leq 6$) or $HPF_6$. Herein, $MF_s \cdot r$ (HF) may be obtained by reacting the M salt with hydrofluoric acid.

The absorber of $PF_5$ is not particularly limited and, for example, a known absorber using a packed tower, a multi-stage tower, a spray tower or the like can be suitably used.

Figure 2:
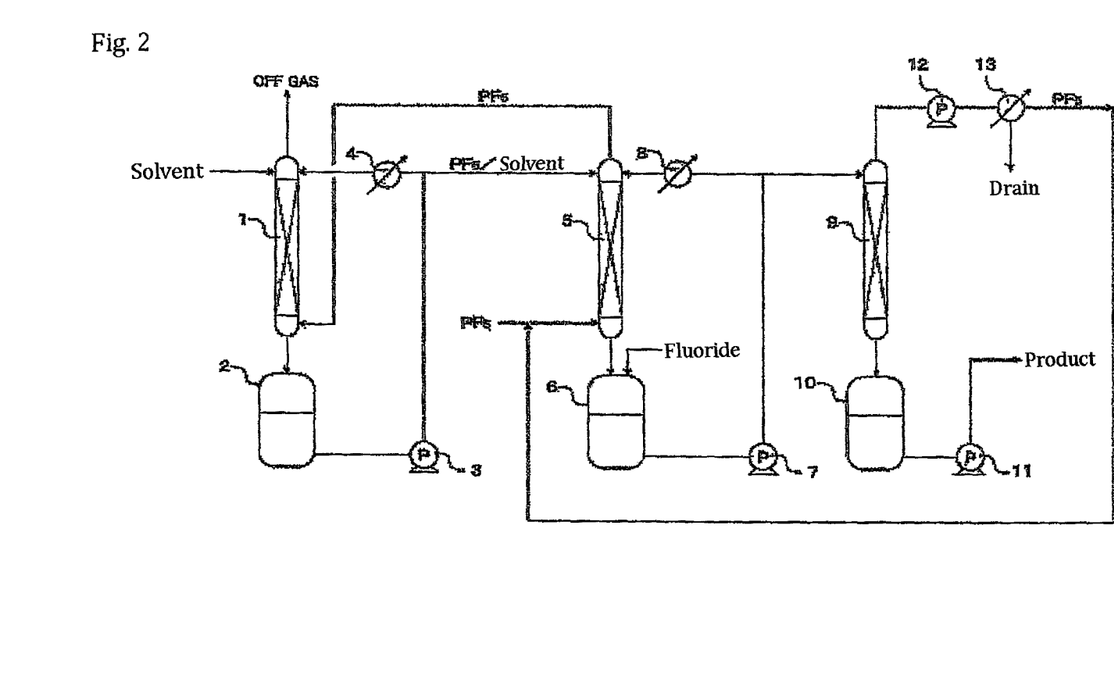
FIG. 2 is a conceptual diagram showing a manufacturing apparatus of phosphorus pentafluoride according to another embodiment of the present invention.

As described above, when a fluoride is reacted with a $PF_5$ gas in an organic solvent, the reaction method is preferably a method in which a $PF_5$ gas is first dissolved in an organic solvent and then a fluoride is added to the organic solvent, thereby reacting the fluoride with the $PF_5$ gas in the organic solvent. A manufacturing apparatus to be applied to the method is shown in FIG. 2. The manufacturing apparatus shown in the drawing includes a first absorption tower 1, a second absorption tower 5, a first vessel 2, a second vessel 6, a third vessel 10, pumps 3, 7 and 11, a first refrigerator 4, a second refrigerator 8, a deaeration tower 9, an air pump 12 and a condenser 13.

In the first vessel 2 and the second vessel 6, a predetermined amount of an organic solvent is charged. Using pumps 3 and 7, solutions in the first vessel 2 and the second vessel 6 are respectively fed to the first absorption tower 1 and the second absorption tower 5, where a circulating operation is performed. Next, a $PF_5$ gas is fed to the tower bottom of the second absorption tower 5. $PF_5$ to be used has a purity of 100%, or may be appropriately diluted by being mixed with an inert gas. Heat generated in the first absorption tower 1 and the second absorption tower 5 can be reduced by mixing the inert gas. The inert gas is not particularly limited and examples thereof include $N_2$, Ar, dry air and carbon dioxide. The moisture content in the inert gas used for dilution is preferably small, for example, 100 ppm by weight or less, more preferably 10 ppm by weight or less, and particularly preferably 1 ppm by weight or less, so as not to induce hydrolysis of $PF_5$. The $PF_5$ gas is dissolved in an organic solvent by counter-currently contacted with the organic solvent in the first absorption tower 1 and the second absorption tower 5 (first step). Heat of absorption of $PF_5$ in the organic solvent is removed by the first refrigerator 4 and the second refrigerator 8 disposed in a circulation line, thus maintaining a proper operating temperature.

Next, the organic solvent containing the $PF_5$ gas dissolved therein is fed to the second vessel 6. To the second vessel 6, a fluoride is fed in the amount that is stoichiometrically equivalent or less than that of $PF_5$. Thus, $PF_5$ reacts with the fluoride to produce hexafluorophosphate (second step). The following reaction scheme shows the reaction of $PF_5$ with lithium fluoride.

$$PF_5 + LiF \rightarrow LiPF_6 \qquad \text{[Chemical Formula 5]}$$

The solution of the hexafluorophosphate produced in the second vessel 6 is fed to the tower top of the second absorption tower 5 through a piping by the pump 7. $PF_5$ fed to the tower bottom is absorbed in the solution of the hexafluorophosphate in the second absorption tower (third step). Subsequently, the concentration of the hexafluorophosphate is increased to a desired concentration by continuously reacted with the fluoride in the second vessel 6. After reaching the desired concentration as a result of such a circulating operation, a portion of the solution from the pump 7 is taken out as a product. Feeding of the organic solvent to the first absorption tower 1 from the outside is initiated simultaneously with takeout of the product and also the object of feeding of the solution by the pump 3 is switched from the first absorption tower 1 to the second absorption tower 5, and then the solution of the hexafluorophosphate is continuously manufactured. In this case, an absorption solution may also be fed to the second absorption tower 5 while continuously circulating a portion of the absorption solution to the first absorption tower 1.

The amount of the fluoride fed to the second vessel 6 is preferably the amount, that is stoichiometrically equivalent or less than that of $PF_5$ dissolved in the organic solvent, so as to avoid the fluoride hardly soluble in the organic solvent from existing in a slurry state. Thus, it becomes possible to avoid occlusion or the like due to a slurry-like fluoride in the apparatus. It is possible to realize stoichiometrically excessive $PF_5$ relative to the fluoride by continuously feeding stoichiometrically excessive $PF_5$ relative to the fluoride. However, since excess $PF_5$ must be discharged out of the system at either of steps, a loss of the raw material occurs, which is not preferable. More preferred is a method of feeding stoichiometrically equivalent $PF_5$ and a fluoride to a solution containing an excess amount, that is proper in view of running, of $PF_5$ absorbed therein in advance.

The fluoride to be added in the second step is not limited to LiF and examples thereof include NaF, KF, RbF, CsF, $NH_4F$, AgF, $CaF_2$, $MgF_2$, $BaF_2$, $ZnF_2$, $CuF_2$, $PbF_2$, $AlF_3$ and $FeF_3$. These fluorides may be used alone, or two or more kinds thereof may be used in combination according to the purpose.

The solution of the hexafluorophosphate, that contains excess $PF_5$ dissolved therein, produced in the second step, is fed to the tower top of the second absorption tower 5 in the third step and a portion of the solution is also fed to the deaeration tower 9. Furthermore, the solution of the hexafluorophosphate fed to the deaeration tower 9 is decompressed by the air pump 12 and the $PF_5$ gas is distilled off. Thus, the solution of the hexafluorophosphate in which $PF_5$ and fluoride are stoichiometrically equivalent is prepared and is taken out as a product from the third vessel 10. It is also possible to prepare a solution of hexafluorophosphate by adding a fluoride, that is stoichiometrically equivalent to excess dissolved $PF_5$, however, it is preferred to distill excess $PF_5$ off under reduced pressure in view of continuous productivity. In order to improve removal efficiency of $PF_5$ under reduced pressure, heating may be performed by providing the deaeration tower 9 with a heater.

The distilled $PF_5$ gas is fed to the tower bottom of the second absorption tower 5 by the air pump 12. Furthermore, the $PF_5$ gas is recovered and recycled by counter-currently contacted with the organic solvent and/or the solution of the hexafluorophosphate in the second absorption tower 5. When a small amount of HF is contained in $PF_5$ to be used as the raw material, after HF is distilled off by decompressing the solution of the hexafluorophosphate by the air pump 12, HF may be removed by condensation by the condenser 13. Although the organic solvent, HF and $PF_5$ are contained in the solution (drain) to be condensed by the condenser 13, the solution may be discarded by a waste water treatment, or HF, $PF_5$ or the organic solvent may be recovered and recycled, if necessary.

As the recovering method, conventional methods such as distillation and extraction can be used.

As described above, in the present invention, a high-purity hexafluorophosphate can be continuously manufactured in satisfactory yield by circulating the solution of the hexafluorophosphate.

In the present invention, an absorption tower is preferably used in view of industrial productive efficiency, however, use of a method using surface absorption or bubbling is not excluded. The first absorption tower 1 and the second absorption tower 5 can be used for an absorber in any form such as a packed tower, plate tower or wetted-wall tower absorber. The absorption may be performed by either counter current or co-current form.

In the first step and the third step, the concentration of a $PF_5$ gas in an organic solvent and a solution of hexafluorophosphate is preferably 15% by weight or less, more preferably 10% by weight or less, and particularly preferably 5% by weight or less. When the concentration of the $PF_5$ gas in the organic solvent is more than 15% by weight, the organic solvent reacts with $PF_5$ and thus coloration, denaturation or solidification of the organic solvent may occur. Also, heat of absorption increases and thus it may become difficult to control the liquid temperature.

In the first step and the third step, the gas-liquid contact temperature of a $PF_5$ gas with an organic solvent and a solution of hexafluorophosphate is preferably from −40 to 100° C., and more preferably from 0 to 60° C. When the gas-liquid contact temperature is lower than −40° C., since the organic solvent is sometimes solidified, it becomes impossible to perform continuous operation. In contrast, when the gas-liquid contact temperature is higher than 100° C., there is a problem that the vapor pressure of $PF_5$ in the organic solvent and the solution of the hexafluorophosphate excessively increases and thus absorption efficiency deteriorates or the organic solvent reacts with $PF_5$.

The organic solvent is preferably at least either of a non-aqueous organic solvent or a non-aqueous ionic liquid. Furthermore, an aprotic organic solvent is preferable. Since the aprotic organic solvent does not have capability of donating hydrogen ions, the solution of the hexafluorophosphate obtained by the manufacturing method of the present invention can be applied directly to an electrolytic solution of electricity storage devices such as a lithium ion secondary battery.

The non-aqueous organic solvent is not particularly limited and examples thereof include ethylene carbonate, propylene carbonate, butylene carbonate, vinylene carbonate, dimethyl carbonate, diethyl carbonate, methylethyl carbonate, methyl acetate, ethyl acetate, γ-butyl lactone, acetonitrile, dimethylformamide, 1,2-dimethoxyethane, methanol and isopropanol. Of these organic solvents, preferred solvents are those that are less likely to cause precipitation of the produced hexafluorophosphate, in other words, those having excellent solubility of the hexafluorophosphate, for example, ethylene carbonate, propylene carbonate, dimethyl carbonate, diethyl carbonate, methylethyl carbonate, acetonitrile and 1,2-dimethoxyethane in view of continuous manufacturing. These organic solvents may be used alone, or two or more kinds thereof may be used in combination.

Furthermore, examples of the non-aqueous and aprotic organic solvent include a cyclic carbonic acid ester, a chain carbonic acid ester, a carboxylic acid ester, a nitrile, an amide and an ether compound. These non-aqueous aprotic organic solvents may be used alone, or two or more kinds thereof may be used in combination.

The non-aqueous ionic liquid is not particularly limited and examples thereof include a fluoride complex salt or a fluoride salt of a quaternary ammonium, a quaternary phosphonium or the like. Specific examples of the quaternary ammonium cation include a tetraalkylammonium cation, an imidazolium cation, a pyrazolium cation, a pyridinium cation, a triazolium cation, a pyridazinium cation, a thiazolium cation, an oxazolium cation, a pyrimidinium cation and a pyrazinium cation. Furthermore, specific examples of the quaternary phosphonium cation include a tetraalkyl phosphonium cation. These non-aqueous ionic liquids may be used alone, or two or more kinds thereof may be used in combination, or may be dissolved in the non-aqueous organic solvent.

The organic solvent may be a non-aqueous organic solvent or a non-aqueous ionic liquid alone or two or more kinds thereof.

It is preferred that the gas containing an excess phosphorus component used in the manufacture of hexafluorophosphate, specifically a $PF_5$ gas is recovered and recycled by absorption in an absorption solution. Examples of the absorption solution include water, an aqueous hydrofluoric acid solution, and a solution containing at least one kind selected from the group consisting of M salts (M is at least one kind selected from the group consisting of Li, Na, K, Rb, Cs, $NH_4$, Ag, Mg, Ca, Ba, Zn, Cu, Pb, Fe and Al). More specifically, the absorption solution includes 0 to 80% by weight of water or an aqueous hydrogen fluoride solution, or 0 to 80% by weight of water or an aqueous hydrogen fluoride solution that contains an M salt (the M salt is at least one of a carbonate, a hydroxide and a halide of at least one selected from the group consisting of Li, Na, K, Rb, Cs, $NH_4$, Ag, Mg, Ca, Ba, Zn, Cu, Pb, Fe and Al) dissolved therein. It is possible to recover the $PF_5$ gas as M$(PF_6)_s$ (wherein $1 \leq s \leq 3$) and/or $H_xPO_yF_z$ (wherein $0 \leq x \leq 3$, $1 \leq y \leq 4$, $0 \leq z \leq 6$) by making the absorption solution to absorb the $PF_5$ gas. Therefore, a loss of the raw material can be suppressed even when an excess amount of the $PF_5$ gas is used.

A phosphorus component-containing gas generated in the manufacture of hexafluorophosphate, specifically phosphorus pentafluoride and a HF gas may be recycled as a carrier gas by introduction into a phosphorus pentafluoride extractor. Therefore, it is possible to suppress a loss of the raw material even when an excess amount of a phosphorus pentafluoride gas is used.

The HF gas generated in the manufacture of hexafluorophosphate may be recycled as a carrier gas, or hydrogen fluoride condensed and recovered or recovered by absorption in water may also be used for the reaction with a raw material having a phosphorus atom.

Regarding $PF_5$ flowing out of the second absorption tower 5 in the manufacture of hexafluorophosphate, as shown in FIG. 2, $PF_5$ is recovered in the first absorption tower 1 connected in series. An organic solvent containing $PF_5$ obtained in the first absorption tower 1 is fed to the second absorption tower 5. $PF_5$ that has not been absorbed in the first absorption tower 1 may be recovered and recycled by the absorbing method described above. Thereby, even when an excess amount of a $PF_5$ gas is used, the entire amount thereof is used, and thus a loss of the raw material can be suppressed.

The reaction apparatus used in the present invention is not particularly limited as long as it is made of a material having resistance to the above-described composition, and stainless steel or carbon steel are preferably used as the material. When a composition composed of anhydrous HF or the above-described composition is leaked or exposed in air, the reaction apparatus may be corroded thereby. When the reaction apparatus is corroded, the resultant product is contaminated with the corroded substance and the contaminant may cause an increase in the metal component content in the product. Therefore, it is preferred to use, as the reaction apparatus, those that have resistance to the above-described composition and are made of a fluororesin, vinyl chloride or polyethylene, or those lined therewith.

EXAMPLES

Preferred examples of this invention will be demonstratively described in detail hereinafter. However, for the materials, blend amounts thereof, and the like described in these examples and comparative examples, the scope of this invention is not limited thereto unless they are in particular restrictively described. Thus, the materials and the like are merely explanatory examples. All of the examples and the comparative examples were conducted under the atmospheric pressure.

Example 1

Figure 3:
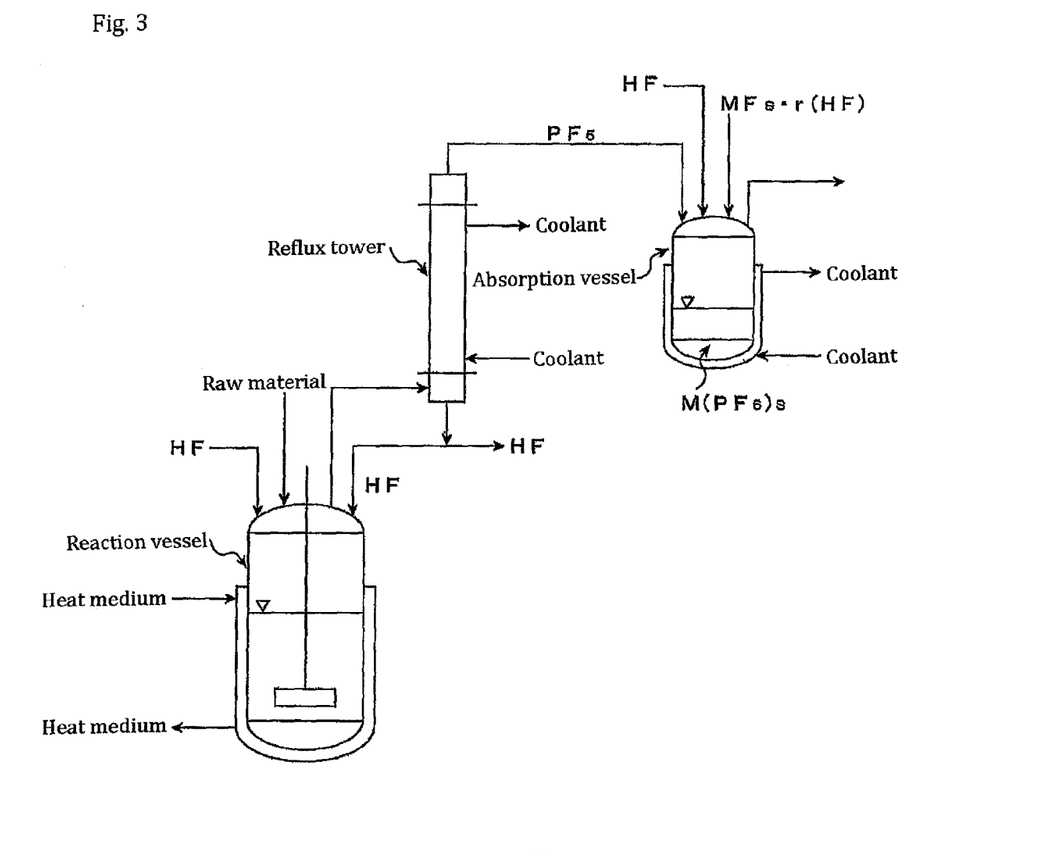
FIG. 3 is a conceptual diagram showing a manufacturing apparatus of phosphorus pentafluoride used in Examples 1 to 6 and Comparative Example 1.

Using the apparatus shown in FIG. 3, the following operations were performed.

In a 5 L reaction vessel made of a fluororesin (PFA), 100 g of commercially available phosphoric anhydride ($P_2O_5$) was placed, together with a rotator, and an anhydrous hydrogen fluoride (HF) gas as a carrier gas was introduced at a rate of 10 L/min. The reaction vessel was connected to a reflux tower (20 mmφ×2 m) made of SUS316. The temperature of the PFA reaction vessel was maintained at 25° C. with a heat medium and, at the same time, the reflux tower was cooled with brine at −50° C. Furthermore, contents in the reaction vessel were stirred by a magnetic stirrer. After a period time, reflux of HF started. Thereafter, the generation of a gas from the tower top of the reflux tower was confirmed.

Five minutes after the gas was generated from the reflux tower, this gas was analyzed by a Fourier transform infrared spectrophotometer (FTIR). As a result, it was confirmed that the gas was composed of $PF_5$ and a small amount of HF. It was confirmed that an oxyfluorophosphoric acid compound such as $POF_3$ or $PO_2F$ was not generated. After making 20 g of the generated gas to be absorbed in 500 g of ultrapure water, the concentration of metal impurities in this ultrapure water was analyzed by an inductively coupled plasma mass spectrometer (ICP-MS). As a result, it was confirmed that the concentration of metal impurities contained in the $PF_5$ gas was 0.5 ppm by weight or less.

Example 2

In a 5 L reaction vessel (cooled with a coolant) made of a fluororesin (PFA), 200 g of a commercially available aqueous 75% phosphoric acid ($H_3PO_4$) solution and 2,000 g of commercially available anhydrous hydrogen fluoride (HF) were placed, together with a rotator, and a $N_2$ gas as a carrier gas was introduced at a rate of 0.2 l/min. The reaction vessel was connected to a reflux tower (20 mmφ×2 m) made of SUS316. The temperature of the PFA reaction vessel was raised to 45° C. with a heat medium and, at the same time, the reflux tower was cooled with brine at −30° C. Furthermore, the reaction solution was stirred by a magnetic stirrer. In a few minutes, as the bath temperature increased, reflux of HF started. The temperature of the reaction solution was 23° C. Thereafter, the generation of a gas from the tower top of the reflux tower was confirmed.

Ten minutes after the generation of the gas from the reflux tower started, this gas was analyzed by a Fourier transform infrared spectrophotomete (FTIR). As a result, it was confirmed that the gas was composed of $PF_5$, $N_2$ and a small amount of HF. It was confirmed that an oxyfluorophosphoric acid compound such as $POF_3$ or $PO_2F$ was not generated. After making 20 g of the generated gas to be absorbed in 0.5 kg of ultrapure water, the concentration of metal impurities in this ultrapure water was analyzed by an inductively coupled plasma mass spectrometer (ICP-MS). As a result, it was confirmed that the concentration of metal impurities contained in the $PF_5$ gas was 0.5 ppm by weight or less.

Example 3

In a 5 L reaction vessel made of a fluororesin (PFA), 50 g of commercially available potassium hexafluorophosphate ($KPF_6$) and 2,000 g of anhydrous hydrogen fluoride (HF) were placed, together with a rotator, and the reaction vessel was connected to a reflux tower (20 mmφ×2 m) made of SUS316. The outside temperature of the PFA reaction vessel was raised to 45° C. with a heat medium and, at the same time, the reflux tower was cooled with brine at −50° C. Furthermore, the reaction solution was stirred by a magnetic stirrer. As the reaction vessel temperature increased, reflux of HF started. The temperature of the reaction solution inside was 21° C.

After 5 minutes, a gas was generated from the reflux tower. This gas was analyzed by FTIR. As a result, it was confirmed that the gas was composed of $PF_5$ and a small amount of HF. After making 10 g of the generated gas to be absorbed in 0.5 kg of ultrapure water, the concentration of metal impurities in this ultrapure water was analyzed by an inductively coupled plasma mass spectrometer (ICP-MS). As a result, it was confirmed that the concentration of metal impurities contained in the $PF_5$ gas was 0.5 ppm by weight or less.

Example 4

In a 5 L reaction vessel made of PFA, 330 g of lithium hexafluorophosphate ($LiPF_5$) and 2,000 g of anhydrous HF were placed, together with a rotator, and the reaction vessel was connected to a reflux tower (20 mmφ×2 m) made of SUS316. The temperature of the PFA reaction vessel was raised to 80° C. with a heat medium and, at the same time, the reflux tower was cooled with brine at 0° C. Furthermore, the reaction solution was stirred by a magnetic stirrer. As the reaction vessel temperature increased, reflux of HF started. The temperature of the reaction solution inside was 30° C.

The gas generated from the reflux tower was analyzed by FTIR. As a result, it was confirmed that this gas was composed of $PF_5$ and a small amount of HF. Simultaneously, the generated gas was made to be absorbed in pure water for 4 hours and the content of P in the absorption solution was measured, and then the weight of the generated $PF_5$ gas was calculated. As a result, the weight was 205 g and 75% of the gas was generated.

Example 5

In a 5 L reaction vessel made of PFA, 90 g of ammonium hexafluorophosphate ($NH_4PF_6$) and 2,000 g of anhydrous HF were placed, together with a rotator, and the reaction solution was stirred by a magnetic stirrer. In the present Example 5, the operation was performed without disposing a reflux tower. The generated gas was analyzed by FTIR and, at the same time, the gas was made to be absorbed in pure water. The PFA reaction vessel was heated to 65° C. with a heat medium. As a result, hydrogen fluoride was vaporized and vigorously reacted with pure water as the absorption solution. The generated gas was analyzed by FTIR. As a result, it was confirmed that this gas was composed of $PF_5$ and a large amount of HF. After making the gas to be absorbed in ultrapure water for 6 hours, the content of P in the absorption solution was measured and the weight of the $PF_5$ gas generated was calculated. As a result, the weight of the $PF_5$ gas was 43 g and the yield was 62%. The concentration of metal impurities in this absorption solution was analyzed by ICP-MS. As a result, it was confirmed that the concentration of metal impurities contained in the $PF_5$ gas was 0.5 ppm by weight or less.

Example 6

In a 20 L-PTFE reaction vessel, 1.5 kg of cesium hexafluorophosphate ($CsPF_6$), 140 g of lithium fluoride (LiF) and 18 kg of anhydrous hydrogen fluoride (HF) were placed, together with a rotator, and the reaction vessel was connected to a reflux tower (20 mm$\phi$×2 m) made of SUS316. Separately, 210 g of silver fluoride (AgF) and 500 g of anhydrous HF were placed in a 3 L-PFA reaction vessel, together with a rotator, and then silver fluoride was dissolved in anhydrous HF. An outlet of the reflux tower was connected to the 3 L-PFA reaction vessel so that the generated gas can be absorbed in the 3 L-PFA reaction vessel. The 20 L-PFA reaction vessel was heated to 70° C. with a heat medium and the 3 L-PFA reaction vessel was cooled with an ice bath. The reflux tower was cooled with brine at 0° C. The contents of two reaction vessels were respectively stirred.

As the temperature of the 20 L-PFA reaction vessel gradually increased and the internal temperature reached 23° C., reflux of HF started. At nearly the same time, the temperature of the 3 L-PFA reaction vessel increased to 5° C. from 0° C. After the reaction was performed for 6 hours, the 3 L-PFA reaction vessel was removed from the reflux tower and crystallization was performed for 48 hours by cooling to −40° C. Next, the supernatant in the 3 L-PFA reaction vessel was slowly taken out and solid-liquid separation was performed. After separation, $N_2$ was introduced into a bottle at a rate of 3 L/minute, followed by drying. Furthermore, drying was performed by a dryer at 85° C. for 3 hours to obtain 395 g of a crystal.

The resultant crystal was analyzed by XRD. As a result, it was found that the crystal was assigned to silver hexafluorophosphate ($AgPF_6$). The moisture content was 30 ppm by weight or less and also the concentration of free hydrofluoric acid was 50 ppm by weight or less. The moisture content was measured by a moisture meter and the concentration of free hydrofluoric acid was determined by titration of sodium hydroxide.

Example 7

In the present example, phosphorus pentafluoride was manufactured using a manufacturing apparatus shown in FIG. 2.
[Step I]
In a 10 L-PTFE reaction vessel, 1.2 kg of acidic potassium fluoride ($KHF_2$) was placed and 5.25 kg of semiconductor grade 75% HF was slowly added while cooling with an ice bath. Furthermore, 1.3 kg of 85 wt % phosphoric acid ($H_3PO_4$) was added over 30 minutes. The reaction and crystallization were performed by stirring in a water bath at +20° C. for 6 hours. The resultant precipitate was collected by suction filtration. The collected crystal was washed with water and then dried at 105° C. for 6 hours. The yield of the resultant crystal was 1.35 kg (yield: 65%). Furthermore, the resultant crystal was measured by XRD and found that the crystal was composed of $KPF_6$.
[Step II]
In a 10 L-PTFE reaction vessel, 1.2 kg of $KPF_6$ obtained above and 6 kg of anhydrous hydrogen fluoride (HF) were placed, together with a rotator, and the reaction vessel was connected to a reflux tower (20 mm$\phi$×2 m) made of SUS316. Separately, 95 g of LiF and 1,200 g of anhydrous HF were placed in a 2 L-PTFE reaction vessel, together with a rotator, and then LiF was dissolved in anhydrous HF. An outlet of the reflux tower was connected to the 2 L-PTFE reaction vessel so that the generated $PF_5$ gas can be absorbed in the 2 L-PTFE reaction vessel. Furthermore, a 3 L-PTFE reaction vessel was connected to the downstream of the 2 L-PTFE reaction vessel for absorption of an exhaust gas. In this 3 L-PTFE reaction vessel, a solution prepared by dissolving 50 g of KF.(HF) in 2 kg of 50% by weight HF was used.

The 10 L-PTFE reaction vessel was heated in a water bath at 85° C., and the 2 L-PTFE reaction vessel and the 3 L-PTFE reaction vessel were cooled with an ice bath. The reflux tower was cooled with brine at 0° C. The contents of three reaction vessels were respectively stirred.

As the temperature of the 10 L-PTFE reaction vessel gradually increased and the internal temperature reached 25° C., reflux of HF started. At nearly the same time, the temperature of the 2 L-PTFE reaction vessel increased to 8° C. from 0° C. and the solution gradually caused white turbidity.
[Step III]
The reaction was performed for 8 hours and the 2 L-PTFE reaction vessel was removed from the reflux tower, followed by stirring for 4 hours while cooled to −40° C. Solid-liquid separation of the resultant crystal was performed by filtration and the resultant crystal was transferred to a 1 L-PFA vessel. At room temperature, $N_2$ was introduced for 4 hours at a flow rate of 3 L/minute, followed by drying. Thereafter, the 1 L-PFA vessel was dried at 85° C. for 3 hours to obtain 350 g of a crystal.

The resultant crystal was analyzed. As a result, the crystal was assigned to $LiPF_6$, and the moisture content was 50 ppm by weight or less and the concentration of free hydrofluoric acid was 50 ppm by weight or less.
[Step IV]
The solution was taken out of the 3 L-PTFE reaction vessel and ion chromatography was performed. As a result, $PF_6^-$ ions were detected. This revealed that the exhaust gas can be trapped and this trap liquid can be recycled as the raw material.
[Step V]
After the reaction, the 10 L-PTFE reaction vessel was removed from the reflux tower and the solution was concentrated in a water bath at 35° C., and then a viscous HF solution containing $KPF_6$/KF.v (HF) (v≧0) was recovered. This solution can be recycled in the first step.

Example 8

In a reaction vessel made of a fluororesin, provided with a metering pump for takeout connected at the bottom, 20 kg of an anhydrous hydrogen fluoride solution was placed. While cooling this anhydrous hydrogen fluoride solution to 10° C., 1 kg of diphosphorus pentaoxide was dissolved. Furthermore, an anhydrous hydrogen fluoride solution containing diphosphorus pentaoxide dissolved therein was fed to a phosphorus pentafluoride generating vessel (made of a fluororesin, volume: 10 L). Feeding was quantitatively performed at a rate of 8 kg/hour. As the phosphorus pentafluoride generating vessel, a vessel including a condenser at 0° C. and a cooler at −50° C.

connected in series was used. An anhydrous hydrogen fluoride gas at 25° C. generated in a carrier gas generating vessel was fed into the anhydrous hydrogen fluoride solution in the phosphorus pentafluoride generating vessel by bubbling. The anhydrous hydrogen fluoride gas was fed at a rate of 40 kg/hour.

In order to maintain the liquid level of the anhydrous hydrogen fluoride solution constant in the phosphorus pentafluoride generating vessel, the anhydrous hydrogen fluoride solution was taken out using a pump. The takeout rate was adjusted to about 8 kg/hour. The liquid temperature of the condensate liquid produced by condensation using the condenser was 20° C. and this condensate liquid was directly recycled by circulating to the carrier gas generating vessel. After a lapse of 30 minutes, a $PF_5$ gas accompanying a very small amount of HF constantly generated from an outlet of the cooler at a rate of 5.5 g/min.

Using the apparatus shown in FIG. 2, the following operations were performed. Commercially available battery grade diethyl carbonate (the moisture concentration: 9 ppm by weight) was placed in a first vessel 2 and a second vessel 6, each being made of a fluororesin, in the amount of 2,603 mL each, and then a circulating operation in each absorption tower and vessel was started using pumps 3 and 7. At this time, the flow rate of the pumps 3 and 7 was adjusted to 1 L/minute each. The first vessel 2 and the second vessel 6 were respectively maintained at a constant temperature of 20° C. using a first refrigerator 4 and a second refrigerator 8, respectively.

Subsequently, the above-described phosphorus pentafluoride gas containing hydrogen fluoride was fed to the tower bottom of the second absorption tower 5 at a rate of 5.5 g/minute. This phosphorus pentafluoride gas was made to be absorbed in an organic solvent for 2 minutes, and feeding of lithium fluoride to the second vessel 6 was started at a rate of 1.13 g/minute. Sixty minutes after starting of feeding of lithium fluoride, takeout of the product was started at a rate of 44.9 ml/minute. Simultaneously with takeout of the product, the organic solvent was fed to the first absorption tower 1 at a rate of 43.4 ml/minute and also the object of feeding of the solution by the pump 3 was switched from the first absorption tower 1 to the second absorption tower 5, followed by continuous operation.

2,947.5 g of the solution was continuously fed to the deaeration tower 9 by continuous operation for 60 minutes and the excess phosphorus pentafluoride gas dissolved in the solution was distilled off by decompression by the air pump 12. After distillation, 2,911.5 g of a solution of lithium hexafluorophosphate was taken out of the third vessel 10. Furthermore, accompanying diethyl carbonate and HF were removed from the distilled phosphorus pentafluoride gas by the condenser 13. Thereafter, a phosphorus pentafluoride gas was made to be absorbed by bubbling into the absorption solution mixed with a separately prepared diethyl carbonate solution, followed by collection.

The thus obtained diethyl carbonate solution of lithium hexafluorophosphate contained 10 ppm by weight or less of an insoluble component, 10 ppm by weight or less of free acid and 10 ppm by weight or less of moisture. Diethyl carbonate was distilled off by decompressing the resultant diethyl carbonate solution of lithium hexafluorophosphate at 40° C. to obtain a white solid. The white solid was analyzed by XRD. As a result, the white solid was assigned to lithium hexafluorophosphate.

Example 9

First, the same operation as in Example 8 was performed to produce a $PF_5$ gas containing a very small amount of HF.

Next, the following operations were performed using the apparatus shown in FIG. 2. Commercially available diethyl carbonate of a battery grade (the moisture concentration: 9 ppm by weight) was placed in a first vessel 2 and a second vessel 6, each being made of a fluororesin, in the amount of 2,603 mL each, and then a circulating operation in each absorption tower and vessel was started using pumps 3 and 7. At this time, the flow rate of the pumps 3 and 7 was adjusted to 1 L/minute each. The first vessel 2 and the second vessel 6 were respectively maintained at a constant temperature of 20° C. using a first refrigerator 4 and a second refrigerator 8, respectively.

Subsequently, the above-described phosphorus pentafluoride gas containing hydrogen fluoride was fed to the tower bottom of the second absorption tower 5 at a rate of 5.5 g/minute. This phosphorus pentafluoride gas was made to be absorbed in an organic solvent for 2 minutes, and feeding of lithium fluoride to the second vessel 6 was started at a rate of 1.13 g/minute. Eighty minutes after starting of feeding of lithium fluoride, takeout of the product was started at a rate of 35.9 ml/minute. Simultaneously with takeout of the product, the organic solvent was fed to the first absorption tower 1 at a rate of 32.5 ml/minute and also the object of feeding of the solution by the pump 3 was switched from the first absorption tower 1 to the second absorption tower 5, followed by continuous operation.

2,380.4 g of the solution was continuously fed to the deaeration tower 9 by continuous operation for 60 minutes and the excess phosphorus pentafluoride gas dissolved in the solution was distilled off by decompression by the air pump 12. After distillation, 2,350.5 g of a solution of lithium hexafluorophosphate was taken out of the third vessel 10. Furthermore, accompanying diethyl carbonate and HF were removed from the distilled phosphorus pentafluoride gas by the condenser 13. Thereafter, a phosphorus pentafluoride gas was made to be absorbed by bubbling into the absorption solution mixed with a separately prepared diethyl carbonate solution, followed by collection.

Furthermore, 709.5 g of ethylene carbonate (the moisture concentration: 7 ppm by weight) was added to 2,350.5 g of the resultant diethyl carbonate solution of lithium hexafluorophosphate to obtain a diethyl carbonate/ethylene carbonate solution of lithium hexafluorophosphate. The resultant solution contained 10 ppm by weight or less of an insoluble component, 10 ppm by weight or less of free acid and 10 ppm by weight or less of moisture.

Figure 4:
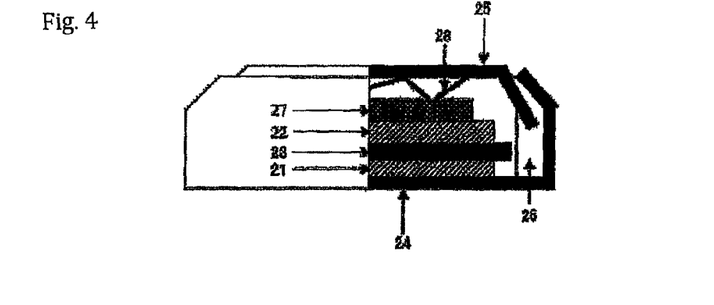
FIG. 4 is an illustrative drawing schematically showing a sectional view of a lithium ion secondary battery of the present invention.

Using the solution thus obtained, the coin type non-aqueous electrolyte lithium secondary battery shown in FIG. 4 was manufactured and then performance as an electrolytic solution was evaluated by a charge/discharge test. Specifically, the test was performed by the following procedure.

<Fabrication of Negative Electrode>

Natural graphite and polyvinylindene fluoride (PVdF) as a binder were mixed at a weight ratio of 9:1 and N-methyl pyrrolidone was added thereto to obtain a paste. This paste was uniformly applied to a 22 μm thick copper foil using an applicator for electrode coating. This coated foil was vacuum dried at 120° C. for 8 hours and a negative electrode 22 having a diameter of 16 mm was obtained by an electrode punching machine.

<Fabrication of Positive Electrode>

A $LiCoO_2$ powder, acetylene black as a conductive auxiliary and PVdF as a binder were mixed at a weight ratio of 90:5:5 and N-methylpyrrolidone was added to this mixture to obtain a paste. This paste was uniformly applied to a 22 μm thick copper foil using an applicator for electrode coating. This coated foil was vacuum dried at 120° C. for 8 hours and a positive electrode 21 having a diameter of 16 mm was obtained by an electrode punching machine.

<Fabrication of Coin Type Non-Aqueous Electrolyte Lithium Ion Secondary Battery>

The positive electrode 21 was disposed on the bottom face of a positive electrode can 24 and a porous separator 23 made of polypropylene was disposed thereon, and then the non-aqueous electrolytic solution prepared in Example 8 was injected and a gasket 26 was inserted. On the separator 23, the negative electrode 22, a spacer 27, a spring 28 and a negative electrode can 25 were subsequently disposed, and then sealing was performed by folding an opening portion of the positive electrode can 24 inward using a coin type battery caulking machine to obtain a non-aqueous electrolyte lithium ion secondary battery. Subsequently, charging was performed at a constant current of 0.4 mA and, when the voltage reached 4.1 V, charging was performed at a constant voltage of 4.1 V for 1 hour. Discharging was performed at a constant current of 1.0 mA until the voltage reached 3.0 V. When the voltage reached 3.0 V, after maintaining the battery at 3.0 V for 1 hour, a charge/discharge test was carried out by charge/discharge cycle. As a result, the charge/discharge efficiency was around 100%, and charging and discharging were repeated for 150 cycles. As a result, the charge capacity did not change.

Example 10

First, the same operation as in Example 8 was performed to produce a $PF_5$ gas containing a very small amount of HF. Next, the following operations were performed using the apparatus shown in FIG. 2. Commercially available diethyl carbonate containing moisture mixed therein (the moisture concentration: 550 ppm by weight) of a battery grade was placed in a first vessel 2 and a second vessel 6, each being made of a fluororesin, in the amount of 2,603 mL each, and then a circulating operation in each absorption tower and vessel was started using pumps 3 and 7. At this time, the flow rate of the pumps 3 and 7 was adjusted to 1 L/minute each. The first vessel 2 and the second vessel 6 were respectively maintained at a constant temperature of 20° C. using a first refrigerator 4 and a second refrigerator 8, respectively.

Subsequently, the above-described phosphorus pentafluoride gas containing hydrogen fluoride was fed to the tower bottom of the second absorption tower 5 at a rate of 5.5 g/minute. This phosphorus pentafluoride gas was made to be absorbed in an organic solvent for 2 minutes, and feeding of lithium fluoride to the second vessel 6 was started at a rate of 1.13 g/minute. Sixty minutes after starting of feeding of lithium fluoride, takeout of the product was started at a rate of 44.9 ml/minute. Simultaneously with takeout of the product, the organic solvent was fed to the first absorption tower 1 at a rate of 43.4 ml/minute and also the object of feeding of the solution by the pump 3 was switched from the first absorption tower 1 to the second absorption tower 5, followed by continuous operation.

2,947.5 g of the solution was continuously fed to the deaeration tower 9 by continuous operation for 60 minutes and the excess phosphorus pentafluoride gas dissolved in the solution was distilled off by decompression by the air pump 12. After distillation, 2,911.5 g of a solution of lithium hexafluorophosphate was taken out of the third vessel 10. Furthermore, accompanying diethyl carbonate and HF were removed from the distilled phosphorus pentafluoride gas by the condenser 13. Thereafter, a phosphorus pentafluoride gas was made to be absorbed by bubbling into the absorption solution mixed with a separately prepared diethyl carbonate solution, followed by collection.

The thus obtained diethyl carbonate solution of lithium hexafluorophosphate contained 82 ppm by weight of an insoluble component and 380 ppm by weight of free acid.

In the same manner as in Example 9, a coin type non-aqueous electrolyte lithium ion secondary battery was fabricated using a diethyl carbonate solution of lithium hexafluorophosphate. In the same manner as in Example 7, performance as the electrolytic solution was evaluated by a charge/discharge test. As a result, the charge/discharge efficiency was 80%, and charging and discharging were repeated for 150 cycles. As a result, a decrease in charge capacity was suppressed to around 20%.

Comparative Example 1

In a 5 L reaction vessel made of PFA, 200 g of $KPF_6$ and 200 g of anhydrous HF were placed, together with a rotator, and the reaction vessel was connected to a reflux tower (20 mm$\phi$×2 m) made of SUS316. Furthermore, the upper portion of the reflux tower was connected to an absorption vessel containing pure water by PFA piping. The PFA reaction vessel was maintained at 15° C. in an ice bath and, at the same time, the reflux tower was cooled with brine at 0° C. Furthermore, the reaction solution was stirred by a magnetic stirrer. The internal temperature of the reaction vessel was 14.2° C., and boiling of the reaction solution did not occur and reflux was not observed in this state.

After 4 hours, P in the absorption solution of the absorption vessel was analyzed by ICP-AES and the weight of the generated $PF_5$ gas determined. As a result, the weight was 0 g and no gas was generated.

Comparative Example 2

In the present Comparative Example 2, lithium hexafluorophosphate was manufactured using the apparatus shown in FIG. 2.

First, commercially available diethyl carbonate of a battery grade (the moisture concentration: 9 ppm by weight) was placed in a first vessel 2 and a second vessel 6, each being made of a fluororesin, in the amount of 2,603 mL each, and then a circulating operation in each absorption tower and vessel was started using pumps 3 and 7. At this time, the flow rate of the pumps 3 and 7 was adjusted to 1 L/minute each. The first vessel 2 and the second vessel 6 were respectively maintained at a constant temperature of 20° C. using a first refrigerator 4 and a second refrigerator 8, respectively.

Next, the HF-containing phosphorus pentafluoride gas obtained in Example 7 was fed to the tower bottom of the second absorption tower 5 at a rate of 5.5 g/minute. This phosphorus pentafluoride gas was made to be absorbed in an organic solvent for 2 minutes, and feeding of lithium fluoride to the second vessel 6 was started at a rate of 1.34 g/minute. Sixty minutes after starting of feeding of lithium fluoride, the second absorption tower 5 was occluded with slurry-like lithium fluoride, which made the operation difficult.

Comparative Example 3

The present example is an example showing a conventional example described in Patent Document 4.

In a 5 L reaction vessel made of PFA, 790 g (9.4 mol) of polyphosphoric acid was added and 1,235 g (61.7 mol) of anhydrous HF was added under stirring while maintained at 25° C. with cooling. Furthermore, 150 g of anhydrous HF was added to obtain 25% excess HF in the solution. The reaction vessel was connected to a reflux tower (cooled to −50° C.) and 1,781 g (14.5-mol) of fuming sulfuric acid (65% $SO_3$) was added over 3 hours while maintaining the temperature at 32° C., and then the generated gas was analyzed by FTIR. As a result, $POF_3$ contained a very small amount of $PF_5$.

Results

As is apparent from Examples 1 to 5, by bringing a carrier gas into contact with various raw materials having a phosphorus atom and a fluorine atom, or various raw materials having a phosphorus atom, high-quality phosphorus pentafluoride was extracted and separated in the above-described carrier gas. Thus, it was confirmed that high-quality phosphorus pentafluoride can be manufactured without generating a large amount of a by-product gas as compared with a conventional method.

As is apparent from Examples 7 to 10, lithium hexafluorophosphate was manufactured by using a phosphorus pentafluoride gas obtained by the manufacturing method of the present invention as the raw material, thus making it possible to manufacture high-quality lithium hexafluorophosphate with low moisture content and high purity by a comparatively simple method. Furthermore, lithium hexafluorophosphate obtained by the method was applied to an electrolytic solution of a coin type non-aqueous electrolyte lithium ion secondary battery, and thus, it was confirmed that it is possible to obtain a lithium ion secondary battery in which a decrease in charge capacity is suppressed even when charging and discharging are repeated.

INDUSTRIAL APPLICABILITY

According to the present invention, it is possible to manufacture inexpensive and high-quality phosphorus pentafluoride with low moisture concentration and high purity without requiring a complicated treatment operation and a special device, using a low-quality raw material. It is also possible to easily manufacture an inexpensive and high-quality hexafluorophosphate without using a complicated device, using high-quality phosphorus pentafluoride obtained by the present invention as a raw material. The high-quality hexafluorophosphate obtained by the present invention can be suitably used in an electrolytic solution for an electricity storage device, a catalyst for an organic synthesis reaction, and the like. Among the hexafluorophosphates, lithium hexafluorophosphate, sodium hexafluorophosphate and potassium hexafluorophosphate can be used as an electrolyte of electricity storage devices for personal computers, potable phones and hybrid cars. Also, silver hexafluorophosphate can be utilized as counter ions that generate an acid required for initiation and growth reactions in photopolymerization. Furthermore, ammonium hexafluorophosphate is useful as a raw material that is used in the manufacture of a pharmaceutical intermediate.

DESCRIPTION OF LETTERS OR NUMERALS

1 First absorption tower
2 First vessel
3 Pump
4 Refrigerator
5 Second absorption tower
6 Second vessel
7 Pump
8 Refrigerator
9 Deaeration tower
10 Third vessel
12 Air pump
13 Condenser
21 Positive electrode
22 Negative electrode
23 Porous separator
24 Positive electrode can
25 Negative electrode can
26 Gasket
27 Spacer
28 Spring

The invention claimed is:

1. A method of manufacturing phosphorus pentafluoride, comprising
bringing a raw material which comprises at least a phosphorus atom and a fluorine atom into contact with a carrier gas,
extracting and separating a phosphorus pentafluoride into the carrier gas such that the carrier gas after the contact does not contain a chlorine atom.

2. The method of manufacturing phosphorus pentafluoride according to claim 1, wherein the fluorine atom in the raw material is contained in the form of hydrogen fluoride.

3. The method of manufacturing phosphorus pentafluoride according to claim 1, wherein a hydrogen fluoride gas is used as the carrier gas.

4. The method of manufacturing phosphorus pentafluoride according to claim 1, wherein the phosphorus pentafluoride is generated by evaporating the phosphorus pentafluoride together with a hydrogen fluoride gas by heating or decompressing of the raw material.

5. The method of manufacturing phosphorus pentafluoride according to claim 1, wherein at least a polyatomic ion containing a phosphorus atom and a fluorine atom exists in the raw material after being contacted with the carrier gas.

6. The method of manufacturing phosphorus pentafluoride according to claim 5, wherein the polyatomic ion contains at least a $PF_6^-$ ion.

7. The method of manufacturing phosphorus pentafluoride according to claim 1, wherein the raw material is reused after generating the phosphorus pentafluoride.

8. A method of manufacturing hexafluorophosphate, comprising the step of:
bringing a raw material which comprises at least a phosphorus atom and fluorine atom into contact with a carrier gas;
extracting and separating a phosphorus pentafluoride into the carrier gas such that the carrier gas after the contact does not contain a chlorine atom; and
reacting fluoride with the phosphorus pentafluoride according to the following chemical reaction scheme, $$sPF_5 + AF_s \rightarrow A(PF_6)_s \qquad \text{[Chemical Formula 1]}$$

wherein s is in the range of $1 \leq s \leq 3$, and A is at least one member selected from the group consisting of Li, Na, K, Rb, Cs, $NH_4$, Ag, Mg, Ca, Ba, Zn, Cu, Pb, Al and Fe.

9. The method of manufacturing hexafluorophosphate according to claim 8, wherein the reaction of phosphorus pentafluoride with the fluoride comprises:
a first step of dissolving a phosphorus pentafluoride gas in a solvent;
a second step of adding a fluoride to the solvent in the amount, which is stoichiometrically equivalent or less than that of phosphorus pentafluoride, to produce a solution of hexafluorophosphate; and
a third step of circulating the solution of the hexafluorophosphate to the first step, thereby dissolving a phosphorus pentafluoride gas in the solution of the hexafluorophosphate in place of the solvent.

10. The method of manufacturing hexafluorophosphate according to claim 9, wherein a hydrogen fluoride solution is used as the solvent.

11. The method of manufacturing hexafluorophosphate according to claim 9, wherein an organic solvent is used as the solvent.

12. The method of manufacturing hexafluorophosphate according to claim 11, wherein the organic solvent is at least one member selected from the group consisting of nonaqueous organic solvents and nonaqueous ionic liquids.

13. The method of manufacturing hexafluorophosphate according to claim 9, wherein a solvent in which water content is not more than 100 ppm by weight is used as the solvent.

14. The method of manufacturing hexafluorophosphate according to claim 9, wherein the first step and the third step are conducted using an absorption tower.

15. The method of manufacturing hexafluorophosphate according to claim 8, wherein a unreacted phosphorus pentafluoride gas among the phosphorus pentafluoride gas is collected by being absorbed into an absorption solution and then be reused.

16. A method of manufacturing phosphorus pentafluoride, comprising the step of: contacting a raw material that contains at least a phosphorus atom with a hydrogen fluoride gas, which functions as a carrier gas, to extract and separate a phosphorus pentafluoride into the hydrogen fluoride gas such that the carrier gas after the contact does not contain a chlorine atom.

17. The method of manufacturing phosphorus pentafluoride according to claim 16, wherein at least a polyatomic ion containing a phosphorus atom and a fluorine atom exists in the raw material after being contacted with the carrier gas.

18. The method of manufacturing phosphorus pentafluoride according to claim 16, wherein the polyatomic ion contains at least a $PF_6^-$ ion.

19. The method of manufacturing phosphorus pentafluoride according to claim 16, wherein the raw material is reused after generating the phosphorus pentafluoride.

20. A method of manufacturing hexafluorophosphate, comprising:
   manufacturing phosphorus pentafluoride by the method of claim 16;
   reacting fluoride with said phosphorus pentafluoride according to the following chemical reaction scheme, $$sPF_5 + AF_s \rightarrow A(PF_6)_s \qquad \text{[Chemical Formula 2]}$$

wherein s is in the range of $1 \leq s \leq 3$, and A is at least one member selected from the group consisting of Li, Na, K, Rb, Cs, $NH_4$, Ag, Mg, Ca, Ba, Zn, Cu, Pb, Al and Fe.

21. The method of manufacturing hexafluorophosphate according to claim 20, wherein the reaction of phosphorus pentafluoride with the fluoride comprises:
   a first step of dissolving a phosphorus pentafluoride gas in a solvent;
   a second step of adding a fluoride to the solvent in the amount, which is stoichiometrically equivalent or less than that of phosphorus pentafluoride, to produce a solution of hexafluorophosphate; and
   a third step of circulating the solution of the hexafluorophosphate to the first step, thereby dissolving a phosphorus pentafluoride gas in the solution of the hexafluorophosphate in place of the solvent.

22. The method of manufacturing hexafluorophosphate according to claim 21, wherein a hydrogen fluoride solution is used as the solvent.

23. The method of manufacturing hexafluorophosphate according to claim 21, wherein an organic solvent is used as the solvent.

24. The method of manufacturing hexafluorophosphate according to claim 23, wherein the organic solvent is at least one member selected from the group consisting of nonaqueous organic solvents and nonaqueous ionic liquids.

25. The method of manufacturing hexafluorophosphate according to claim 21, wherein a solvent in which water content is not more than 100 ppm by weight is used as the solvent.

26. The method of manufacturing hexafluorophosphate according to claim 21, wherein the first step and the third step are conducted using an absorption tower.

27. The method of manufacturing hexafluorophosphate according to claim 20, wherein an unreacted phosphorus pentafluoride gas among the phosphorus pentafluoride gas is collected by being absorbed into an absorption solution and then reused.

* * * * *

UNITED STATES PATENT AND TRADEMARK OFFICE
CERTIFICATE OF CORRECTION

| | | |
|---|---|---|
| PATENT NO. | : 8,470,278 B2 | Page 1 of 1 |
| APPLICATION NO. | : 12/990914 | |
| DATED | : June 25, 2013 | |
| INVENTOR(S) | : Waki et al. | |

It is certified that error appears in the above-identified patent and that said Letters Patent is hereby corrected as shown below:

On the Title Page

In column 2 (Page 2, item 56) at line 8, Under Other Publications, change "(PCI5) usign" to --(PC15) using--.

In column 2 (Page 2 item 56) at line 12, Under Other Publications, change "Fluoriborate," to --Fluoroborate--.

In column 2 (Page 2 item 56) at line 35, Under Other Publications, change "Sourches" to --Sources--.

In the Specification

In column 22 at line 53, Change "polyvinylindene" to --polyvinylidene--.

In column 25 at line 48, Change "potable" to --portable--.

Signed and Sealed this
Second Day of September, 2014

Michelle K. Lee
*Deputy Director of the United States Patent and Trademark Office*